(12) United States Patent
Eggleston et al.

(10) Patent No.: US 10,352,381 B2
(45) Date of Patent: Jul. 16, 2019

(54) BRAKE DISCS

(71) Applicant: Eurac Limited, Poole (GB)

(72) Inventors: David Eggleston, Wimborne (GB); Hares Neme Hakim, Bogota (CO); Jason Robert Perkins, Wimborne (GB); Stewart Daniel Wren, Poole (GB)

(73) Assignee: EURAC LIMITED, Dorset (GB)

( * ) Notice: Subject to any disclaimer, the term of this patent is extended or adjusted under 35 U.S.C. 154(b) by 0 days.

(21) Appl. No.: 15/660,043

(22) Filed: Jul. 26, 2017

(65) Prior Publication Data

US 2018/0058523 A1    Mar. 1, 2018

(30) Foreign Application Priority Data

Jul. 26, 2016 (GB) .................................. 1612891.0
Apr. 13, 2017 (GB) .................................. 1706068.2

(51) Int. Cl.
*F16D 65/12* (2006.01)
*F16D 65/02* (2006.01)

(52) U.S. Cl.
CPC .... *F16D 65/123* (2013.01); *F16D 2065/1324* (2013.01); *F16D 2065/1344* (2013.01); *F16D 2065/1348* (2013.01); *F16D 2065/1356* (2013.01); *F16D 2065/1376* (2013.01); *F16D 2200/003* (2013.01); *F16D 2200/0013* (2013.01); *F16D 2250/0007* (2013.01)

(58) Field of Classification Search
CPC .............................. F16D 65/123; F16D 65/125
USPC ........................ 188/17, 18 A, 218 A, 218 XL
See application file for complete search history.

(56) References Cited

U.S. PATENT DOCUMENTS 2,603,316 A * 7/1952 Pierce .................. F16D 65/123 188/218 XL
6,098,764 A * 8/2000 Wirth .................... F16D 65/123 188/218 XL (Continued)

FOREIGN PATENT DOCUMENTS

DE    102007039577 A1    2/2009
EP         1426644 A2    6/2004

(Continued)

OTHER PUBLICATIONS

Search Report of GB Appln. No. 1612891.0 dated Jan. 14, 2017 in English.

(Continued)

*Primary Examiner* — Christopher P Schwartz
(74) *Attorney, Agent, or Firm* — Fitch, Even, Tabin & Flannery, LLP

(57) ABSTRACT

A brake disc for a high performance vehicle comprises a rotor 20 formed of grey cast iron and comprising a friction ring 24 annular about an axis of rotation 26 and, coaxial with the friction ring 24, a tubular flange 28 extending axially from the friction ring 24 to a free end 28a and having a wall 28e with a radially inner face 28c and a radially outer face 28d. A hub 22 formed of aluminum is cast over the flange 28 to encapsulate at least a portion of the wall 28e, with which it has a shrink-fit connection. The encapsulated portion of the wall is made smooth (or otherwise formed with a varying radial dimension, or a screw thread) so as to permit differential thermal contraction, in an axial direction, of the hub 22 relative to the flange 28 as the hub 22 solidifies and cools after its casting. By this means, retained stresses in the hub 22 are minimized.

15 Claims, 30 Drawing Sheets

(56) References Cited

U.S. PATENT DOCUMENTS

| | | | |
|---|---|---|---|
| 6,257,376 B1 * | 7/2001 | Borgeaud | F16D 55/32 188/71.5 |
| 6,267,209 B1 | 7/2001 | Gross | |
| 7,775,332 B2 * | 8/2010 | Hanna | F16D 65/127 188/218 XL |
| 7,975,750 B2 * | 7/2011 | Dessouki | F16D 65/0018 164/100 |
| 2005/0034932 A1 * | 2/2005 | Chen | B60B 27/023 188/17 |
| 2005/0161187 A1 | 7/2005 | Kodama | |
| 2006/0081425 A1 * | 4/2006 | Chen | B60B 27/0005 188/218 XL |
| 2009/0078515 A1 | 3/2009 | Ixa | |
| 2010/0084110 A1 * | 4/2010 | Strom | B22D 19/04 164/498 |
| 2013/0037359 A1 * | 2/2013 | Kim | F16D 65/12 188/218 XL |
| 2013/0277157 A1 * | 10/2013 | Huang | B22D 19/0081 188/72.4 |
| 2015/0136546 A1 * | 5/2015 | Kim | F16D 65/125 188/218 XL |
| 2015/0345577 A1 * | 12/2015 | Watarai | B60B 27/0052 301/6.8 |
| 2016/0305498 A1 * | 10/2016 | Eggleston | F16D 65/123 |
| 2017/0037917 A1 * | 2/2017 | Zhou | F16D 65/123 |
| 2017/0074336 A1 * | 3/2017 | Burgoon | F16D 65/123 |
| 2018/0058523 A1 * | 3/2018 | Eggleston | F16D 65/123 |

FOREIGN PATENT DOCUMENTS

| | | |
|---|---|---|
| EP | 3081826 A1 | 10/2016 |
| WO | 2007/033378 A1 | 3/2007 |
| WO | 2012101561 A1 | 8/2012 |

* cited by examiner

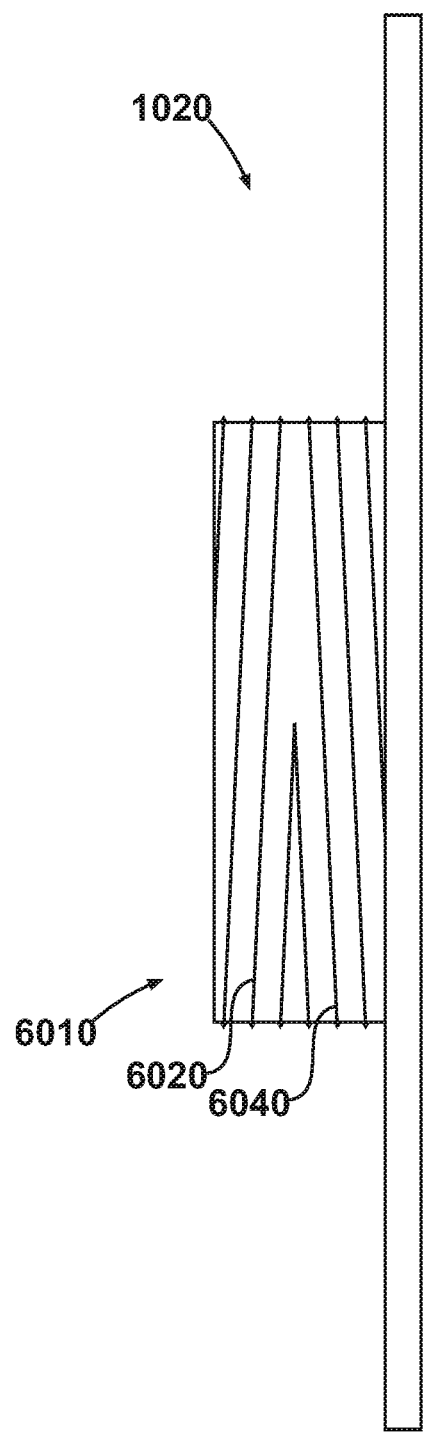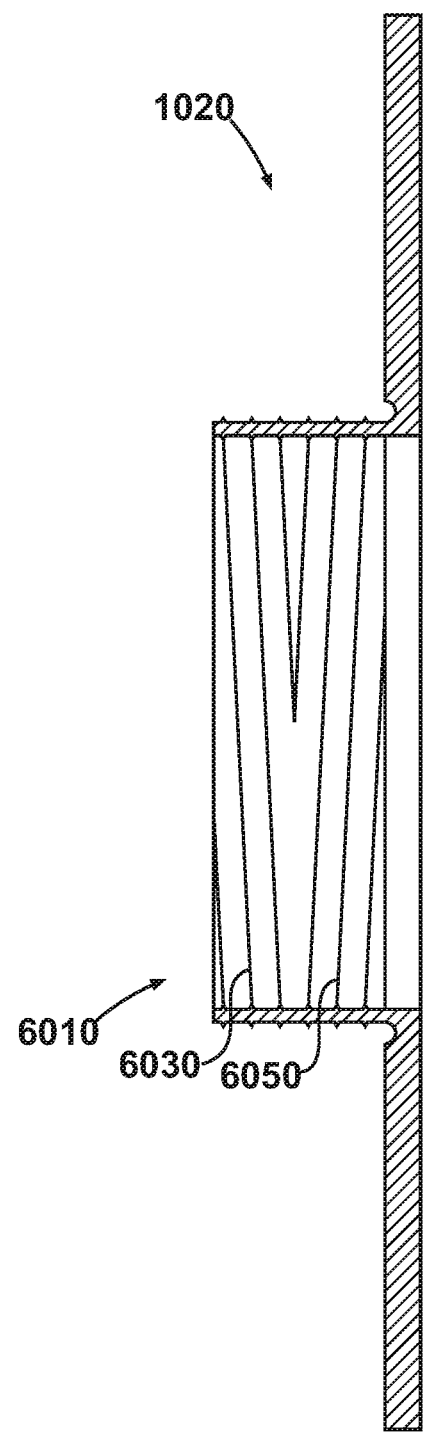
*Fig. 26A*          *Fig. 26B*

BRAKE DISCS

CROSS-REFERENCE TO RELATED APPLICATIONS

This application claims the benefit of British Patent Application No. 17 06 068.2 filed Apr. 17, 2017, and 16 12 891.0 filed Jul. 26, 2016, the contents of which are incorporated herein by reference as if fully rewritten herein.

This invention concerns brake discs, particularly but not necessarily exclusively brake discs for high performance motor vehicles such as sports cars.

A brake disc of a vehicle comprises a rotor comprising a friction ring that rotates with a ground-engaging wheel of the vehicle and is gripped by caliper-operated pads to slow the vehicle down when required. The friction ring must be able to resist both wear from the brake pads and heat generated by the braking. For these reasons brake disc rotors are conventionally made of cast iron.

However, as is well known, cast iron is a relatively heavy material for use in a sports car: it is, for instance, about two and a half times as heavy as aluminium. Therefore, to reduce the weight of the disc brake as a whole, the friction ring may be carried on a hub formed of lighter material such as aluminium or an aluminium alloy. The hub, sometimes known as a mounting bell or a "top hat", is in use connected to a ground-engaging wheel or an axle of the wheel.

This so-called "composite" form of construction (which should not be confused with the possible use of fibre-reinforced plastics materials) contrasts with monolithic forms in which the friction ring and the hub are integrally formed from the same material in that it requires a connection between the hub and the friction ring that will withstand both rotational forces in braking (and acceleration) and transverse forces in cornering.

Various kinds of such connection have been previously proposed. For example, a friction ring of cast iron may be connected to a substantially lighter cast light-aluminium or deep-drawn sheet-steel brake-disc hub. Spigots on the friction ring engage in associated recesses in the hub to transmit rotational forces and a retaining ring secures the joint against transverse (axial) forces, but additional screw connections are also recommended. However, the retaining ring and screw connections necessarily add to the complexity of such an arrangement, and a simpler arrangement is to be preferred.

European patent application EP1426644 describes a composite brake disc in which a rotor comprising grey cast iron has cast onto it a hub section comprising aluminium with a geometric coupling called a "form-fit" connection (form-schlüssige Verbindung) between them to deal with the rotational and transverse forces in use. This form-fit connection comprises circumferentially spaced axially-extending teeth on the rotor that are received in axial seats in the hub section and circumferentially spaced radially-extending teeth on the rotor that are received in radial seats in the hub section.

European patent application EP3081826 describes a composite brake disc in which a rotor comprising grey cast iron has cast onto it a hub comprising aluminium with a connection between the rotor and the hub that comprises circumferentially spaced axial teeth (but not radial teeth) and in which the hub is a shrink-fit on the rotor. This is a simpler and therefore cheaper arrangement than that of EP1426644 and it also has the advantage of preventing even small relative movements between the rotor and the hub which are admitted in EP1426644 and are undesirable.

The present invention provides improvements over EP3081826.

Thus according to a first aspect of the invention there is provided a brake disc for a vehicle, which brake disc comprises:

a rotor formed of a first material and comprising a friction ring annular about an axis of rotation and, coaxial with the friction ring, a tubular flange extending axially from the friction ring to a free end and having a wall with a radially inner face and a radially outer face; and a hub securable to a wheel or an axle of the vehicle for rotation therewith about said axis and being formed of a second material of a lower density, a lower melting point and a higher coefficient of thermal expansion than said first material;

the hub being cast over said flange to encapsulate at least a portion of said wall and being a shrink fit thereupon;

wherein the encapsulated portion of the wall is so configured and arranged as to permit differential thermal contraction, in an axial direction, of the hub relative to the flange as the hub solidifies and cools after its casting.

An important benefit of configuring and arranging the encapsulated portion of the wall so as to permit differential thermal expansion of the hub relative to the flange as the hub solidifies and cool after its casting (which will be discussed in more detail hereinafter) is that it minimises retained stresses in the hub. This can be achieved even though, as is preferred, the hub is a shrink-fit on the flange.

The encapsulated portion of the wall may be formed with axially-extending (but not radially-extending) teeth and it may be made smooth, eg by a machining operation such as turning or honing. In this way the present invention contrasts with the arrangement of EP1426644, which has radially-extending teeth and in which the coupling portion of the rotor is explicitly maintained rough, both of which features would act against the differential thermal contraction in the axial direction provided by the present invention.

The flange may have a radial dimension which varies along its axial extent. Otherwise, or as well, the encapsulated portion of the wall may be formed with a screw thread extending helically about the axis of rotation (to allow differential thermal contraction of the hub along the helical path of the thread).

In a second aspect the invention provides a brake disc for a motor vehicle comprising:

a friction ring having an inner radius and an outer radius;

a hollow flange extending axially from the inner radius of the friction ring, and having an inner surface with a first thread thereon, and an outer surface with a second thread thereon of opposite handedness to the first thread; and a mounting bell that extends over the inner surface and the outer surface of the flange in engagement with the first thread and the second thread;

wherein the friction ring and the flange are integrally formed of a first material, and the mounting bell is formed of a second material different to the first material.

The invention will now be described by way of example only with reference to the accompanying drawings which are purely schematic and in which—

FIG. 26A and FIG. 26B are respectively a front elevation and a section of an alternative embodiment of the friction ring shown in FIG. 22 which has two threads of opposite handedness on both the inside and outside of its flange;

Referring first to FIGS. 1 to 4 these illustrate a prior art brake disc as described and claimed in EP3081826 (upon which the present invention makes various improvements).

Figure 1:
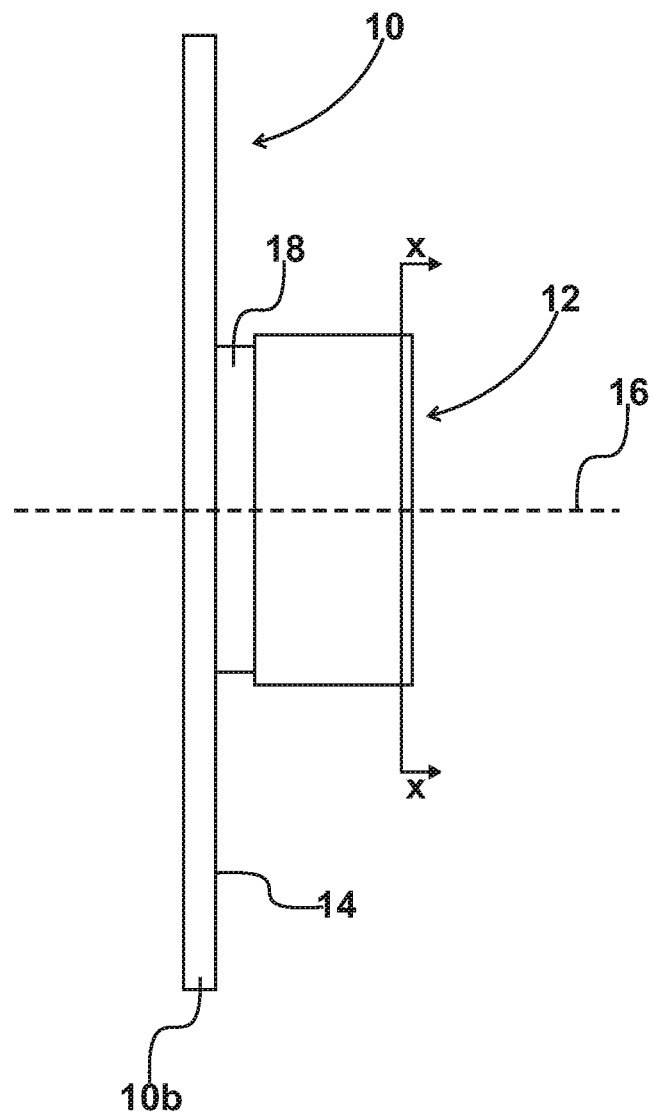
FIGS. 1 to 4 illustrate a prior art brake disc having a hub cast on to a flange of a rotor to encapsulate a portion of the wall of the flange, which figures comprise respectively in FIG. 1 a side elevation, in FIG. 2 an end elevation, in FIG. 3 a cross section at X-X of FIG. 1 and in FIG. 4 a view of circumferentially spaced axially-extending teeth.
Figure 2:
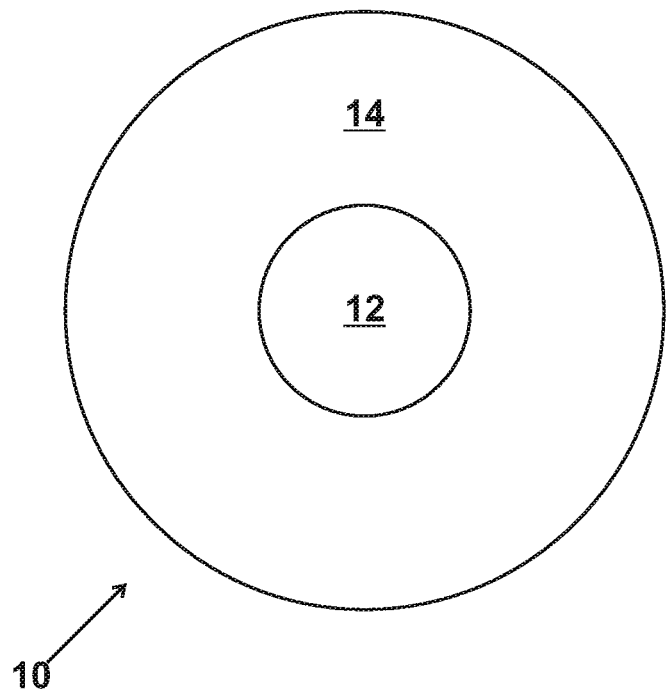
Figure 3:
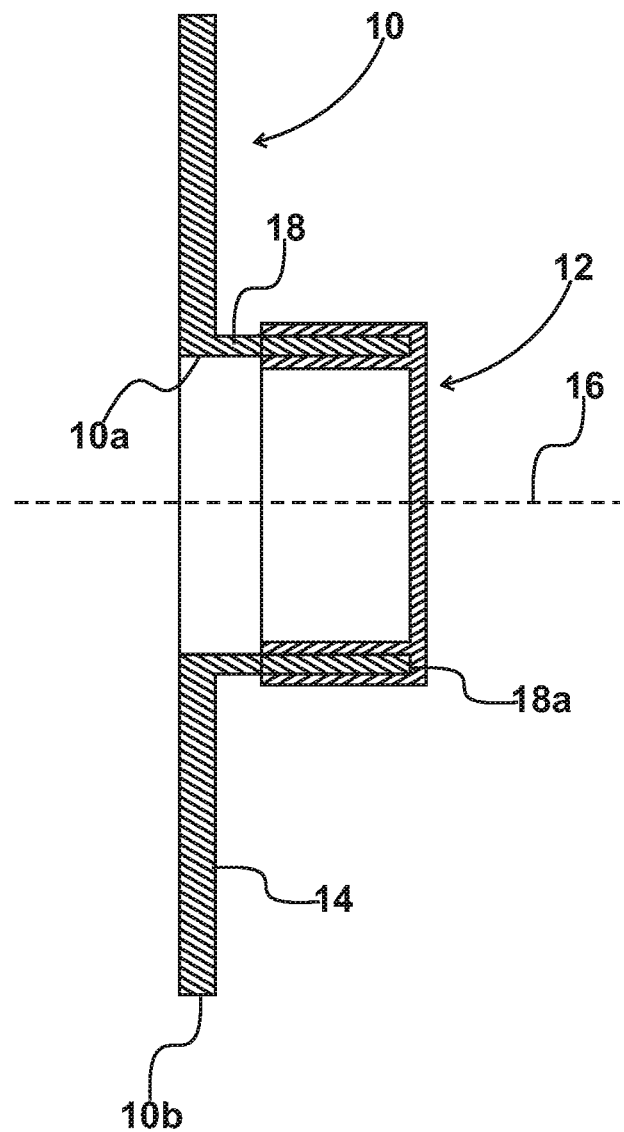
Figure 4:
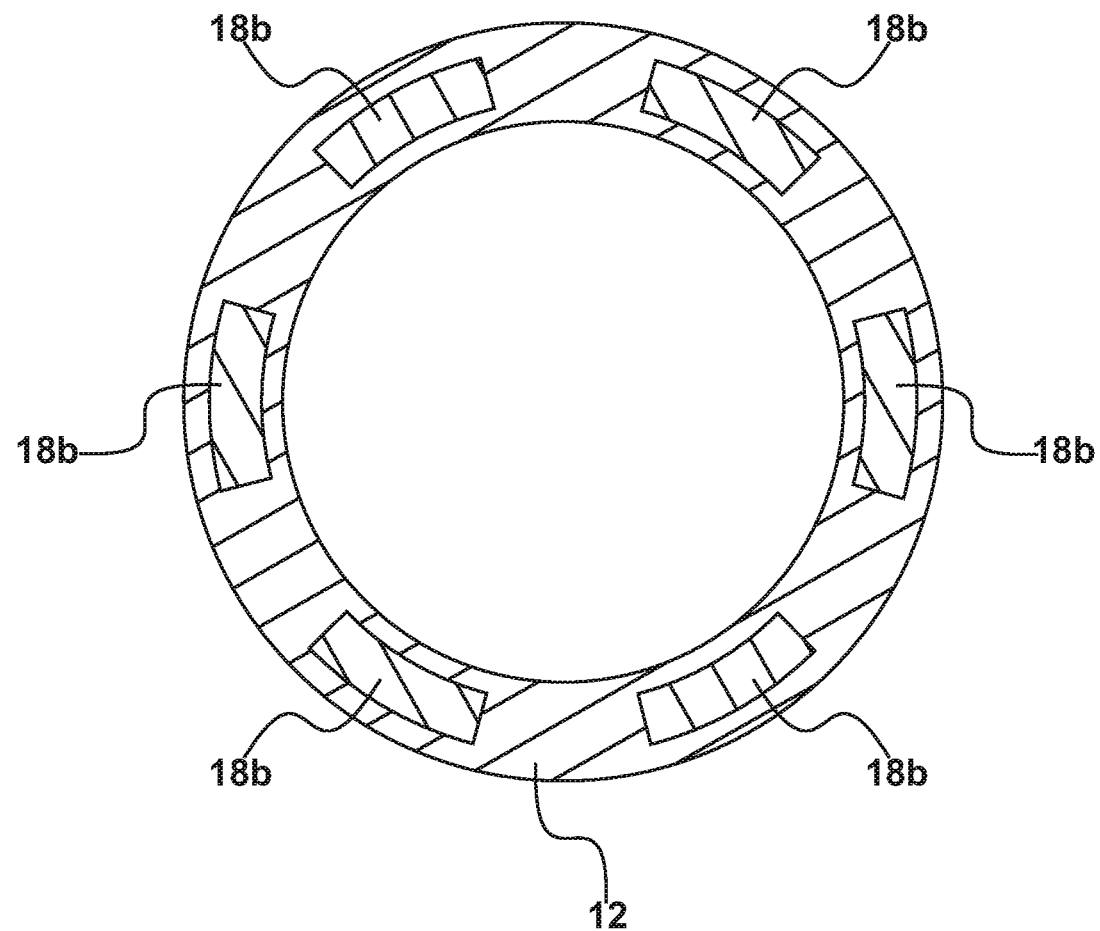
Figure 5:
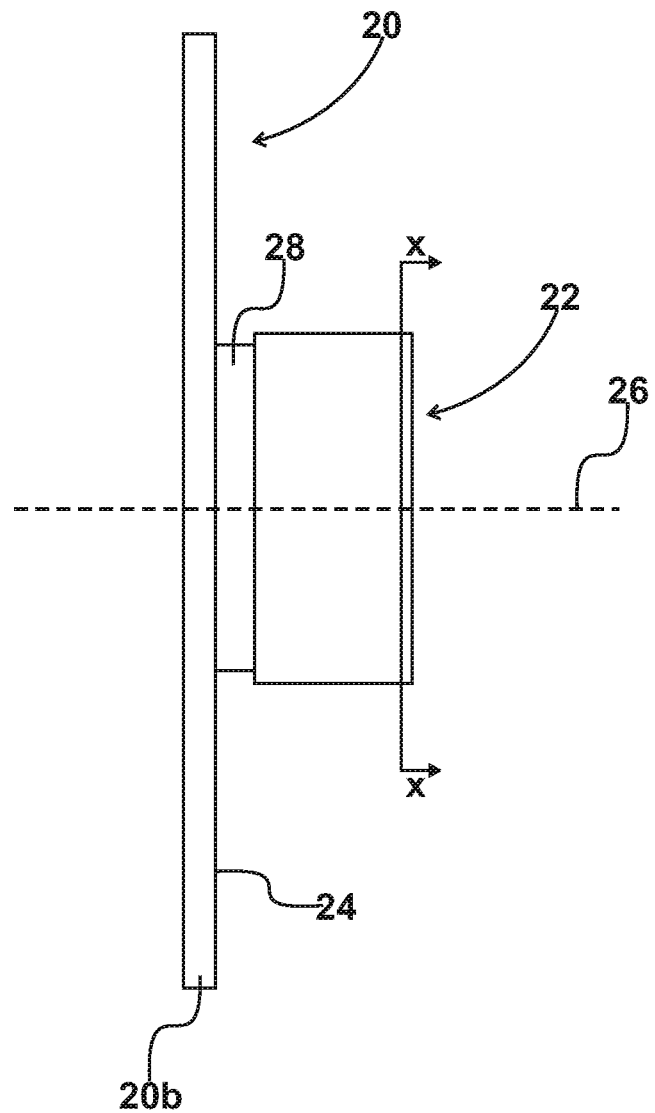
FIGS. 5 to 8 illustrate a first improvement upon the brake disc of FIGS. 1 to 4, in which the encapsulated portion of the flange wall is smooth, which figures comprise respectively in FIG. 5 a side elevation, in FIG. 6 an end elevation, in FIG. 7 a cross section at X-X of FIG. 5 and in FIG. 8 a view of circumferentially spaced axially-extending teeth.
Figure 6:
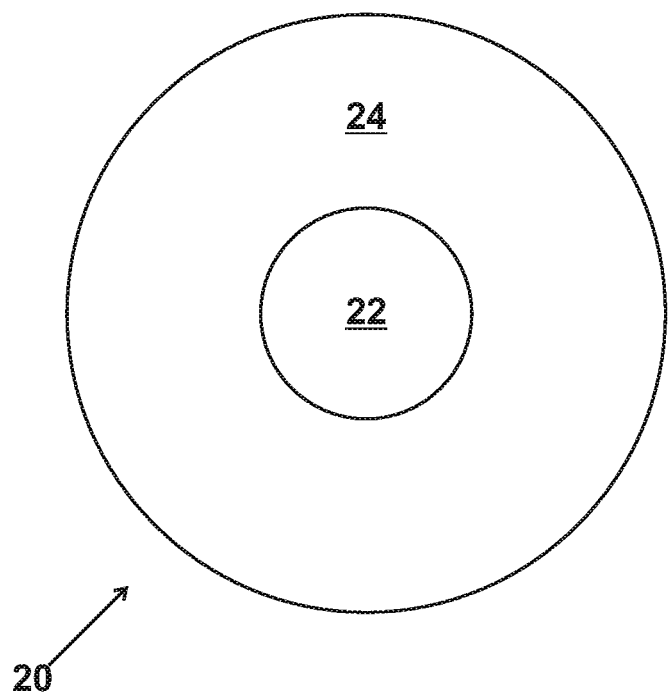
Figure 7:
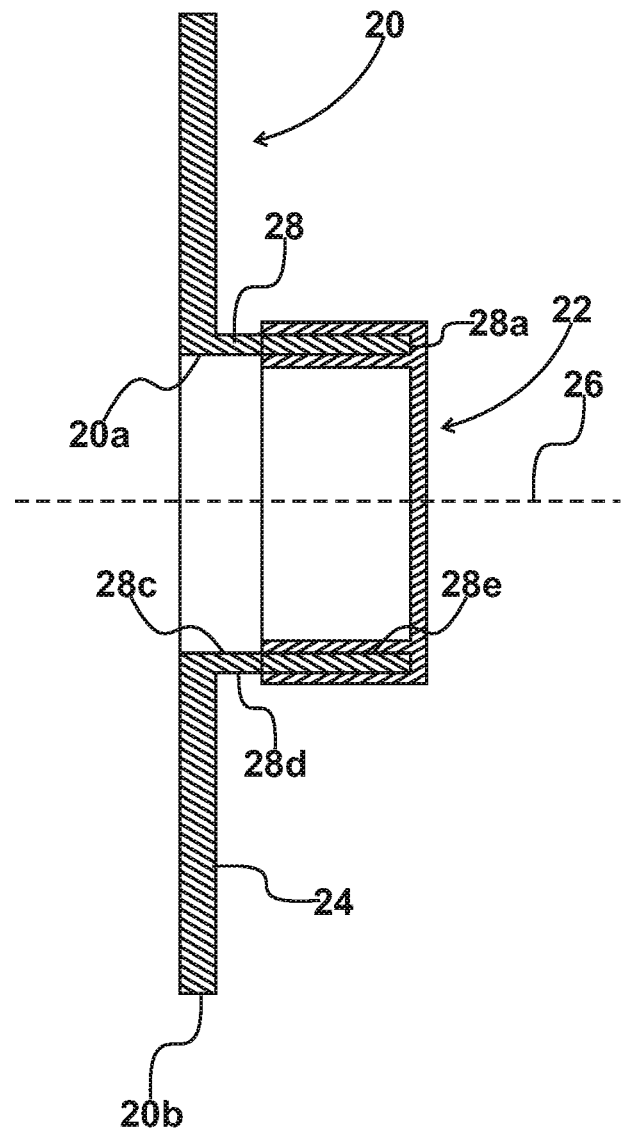
Figure 8:
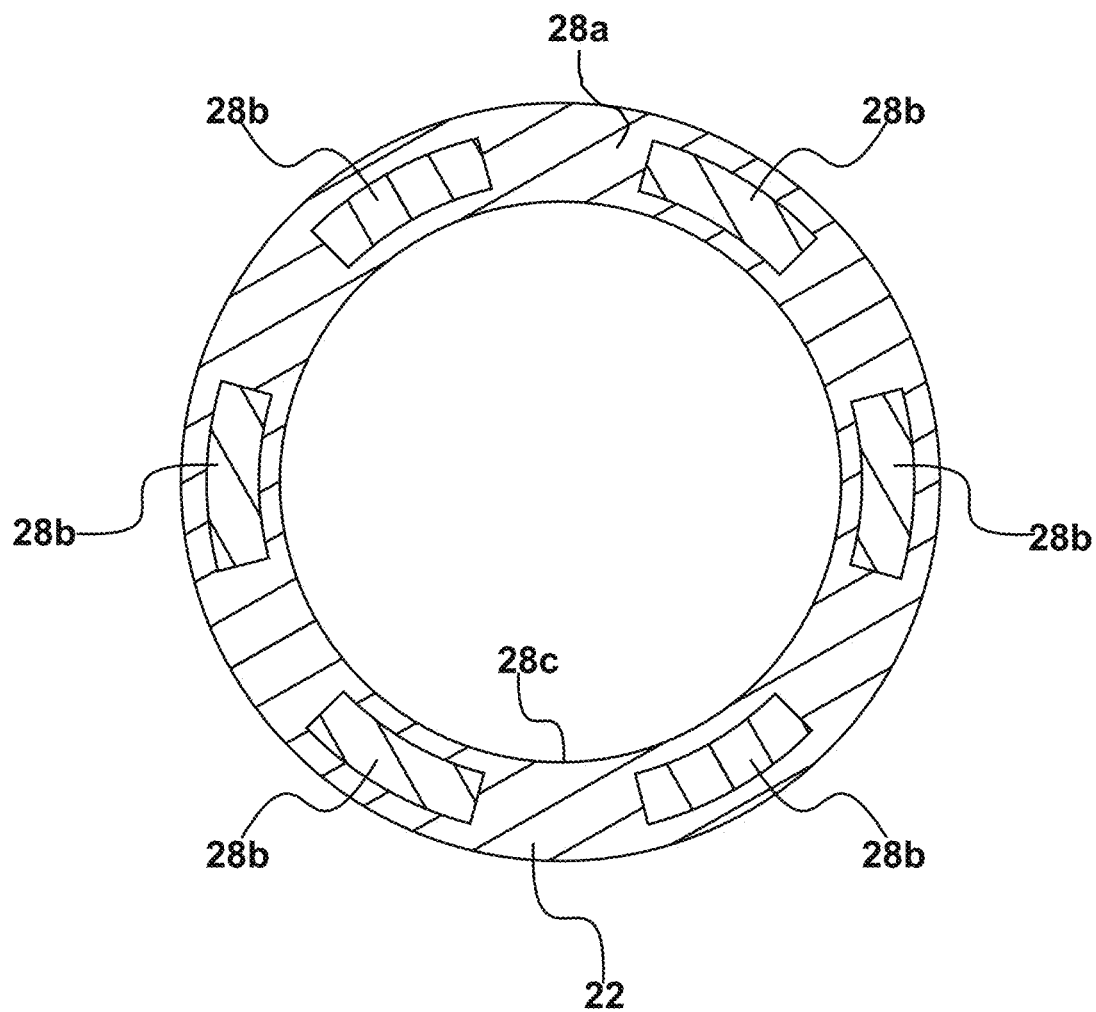

The prior art brake disc of FIGS. 1 to 4 comprises a rotor indicated at 10 and a hub indicated generally at 12. The rotor 10 comprises a friction ring 14 annular about an axis 16, being the axis of rotation of a road wheel or axle, not shown. (It should be understood that the friction ring 14 is shown as a simple annular disc in all the drawings, for simplicity of illustration, but it may well comprise two parallel and coaxial friction elements with an air gap between them for cooling purposes). A tubular flange 18 extends axially from the friction ring 14 to a free end 18a (FIG. 3). The friction ring 14 extends radially from an inner radius 10a to an outer radius 10b, the inner radius being coterminous with the inside of the hollow cylindrical flange 18. The friction ring 14 and the flange 18 are integrally formed from grey cast iron by casting and machining. The hub 12 is formed by casting from aluminium (or aluminium alloy) and as can be seen most clearly from FIG. 3 the casting extends axially over part of the radially inner and the radially outer faces of the flange 18. That is to say, the casting of the hub 12 encapsulates a portion of the flange 18 and engages radially inner and outer surfaces of the flange 18 and thereby makes a connection between the hub 12 and the rotor 10. The hub 12 is a shrink fit upon the encapsulated portion of the flange 18. In addition, as can be seen from FIG. 4, the flange 18 is formed with circumferentially spaced axially-extending teeth 18b encapsulated in the casting of the hub 12. (For simplicity of illustration, only a few teeth 18a are shown in FIG. 4, and in practice there may be more).

Turning now to FIGS. 5 to 8, these illustrate a form of brake disc embodying the present invention. The brake disc of FIGS. 5 to 8 comprises a rotor indicated at 20 and a hub indicated generally at 22. The rotor 20 comprises a friction ring 24 annular about an axis 26, being the axis of rotation of a road wheel or axle, not shown. A tubular flange 28 extends axially from the friction ring 24 to a free end 28a (FIG. 3). The friction ring 24 and the flange 28 are integrally formed from grey cast iron by casting and machining. The hub 22 is formed by casting from aluminium (or aluminium alloy) and as can be seen most clearly from FIG. 3 the casting extends axially over part of the radially inner face 28c and the radially outer face 28d of the flange 28 radially bounding the wall 28e of the flange 28. That is to say, the casting of the hub 12 encapsulates a portion of the flange wall 28e and by engaging the radially inner face 28c and the radially outer face 28d of the flange 18 makes a connection between the hub 22 and the rotor 20. The hub 22 is a shrink fit upon the encapsulated portion of the wall 28e. In addition, as can be seen from FIG. 8, the flange 28 is formed at its free end with circumferentially spaced axially-extending teeth 28b encapsulated in the casting of the hub 22.

When aluminium or aluminium alloy (eg of the hub 22) is cast on to grey cast iron (eg of the rotor 20) the interface is liable to a form of galvanic corrosion because of the difference in electrode potential between the two materials. (The same is true, of course, of any two materials of differing electrode potential that are in contact in an electrolyte). Inasmuch as aluminium alloy has a substantially higher coefficient of linear thermal expansion than grey cast iron, the hub 22 contracts inwardly—towards the axis 26—rather more than the flange 28 as it cools after being cast, to form a tighter joint with the flange 28. This protects the interface between the two materials against the ingress of moisture which could function as an electrolyte and thereby give rise to galvanic corrosion.

As thus far described, the brake disc of FIGS. 5 to 8 is essentially the same as the prior art brake disc of FIGS. 1 to 4. But there is an important underlying difference. This is that the inner and outer surfaces 28c and 28d of the flange wall 28e are both made smooth. This is done by turning or honing etc during the machining of the rotor and its effect is to minimise retained stresses in the hub 22, as will now be explained. The hub 22 contracts as it solidifies after casting, and carries on contracting relative to the rotor 20 as it cools after casting, the aluminium of the hub 22 having a substantially greater coefficient of thermal expansion than the grey cast iron of the rotor 20. The smooth surfaces 28c and 28d allow the relatively contracting hub 22 to retract along the wall 28e of the flange 28, whereby retained stresses in the hub 22 are minimised. The geometry of the interface between the hub 22 and the wall 28e is such that the hub 22 can contract as it cools without geometric resistance imposed by the rotor 20 and without weakening of the interface as the hub 22 cools and contracts. The iron rotor 20 is preheated before the aluminium hub 22 is cast upon it, so it also contracts during the cooling process, but to a lesser degree than the hub 22.

Thus the smooth faces 28c and 28d of the flange wall 28e permit differential thermal contraction, in an axial direction, of the hub 22 relative to the flange 28, and the result is a strong shrink-fit connection between the hub 22 and the rotor 20 without untoward retained stresses in the hub 22.

The encapsulated teeth 28b at the free end 28a of the flange 28 positively resist rotational forces in use of the brake disc of FIGS. 5 to 8. (The term "positively resist" and related terms used herein should be understood to mean that there is a physical barrier to movement in the direction of the forces applied, and not just a gripping resistance from the shrink-fit connection). It is advisable to provide similarly positive resistance to axial forces. This can be achieved in the present invention without comprising the need to avoid an untoward build-up of retained stresses in the hub, as will now be described firstly with reference to FIGS. 9 to 11.

Figure 9:
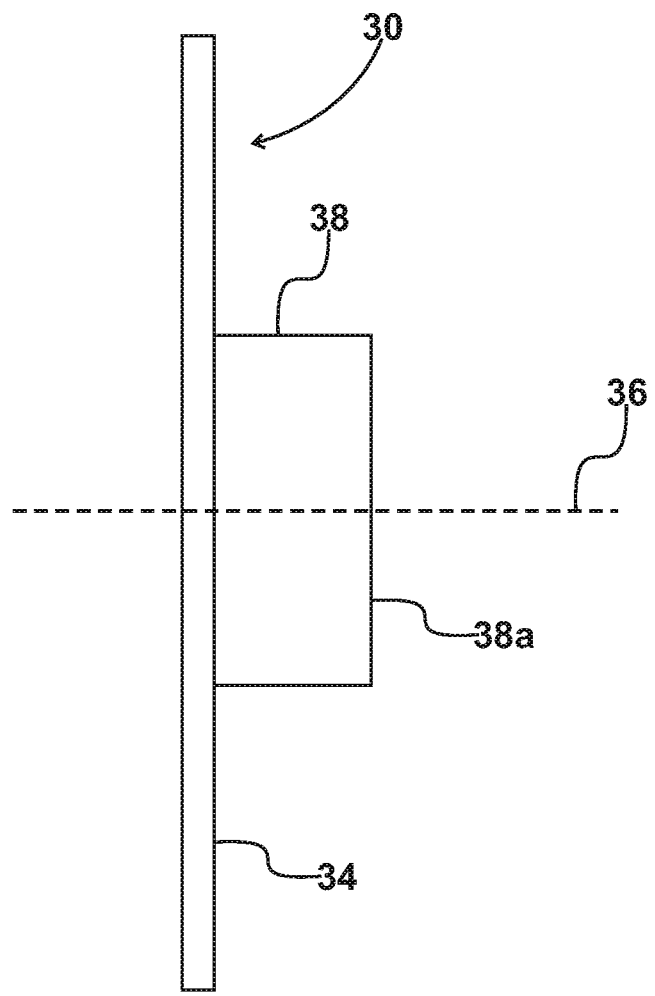
FIGS. 9 to 11 illustrate a second improvement upon the brake disc of FIGS. 1 to 4, in which the flange has a radial dimension which varies along its axial extent, which figures comprise respectively in FIG. 9 a side elevation, in FIG. 10 an end elevation and in FIG. 11 a cross section at X-X of FIG. 9, showing the rotor with the hub omitted.
Figure 10:
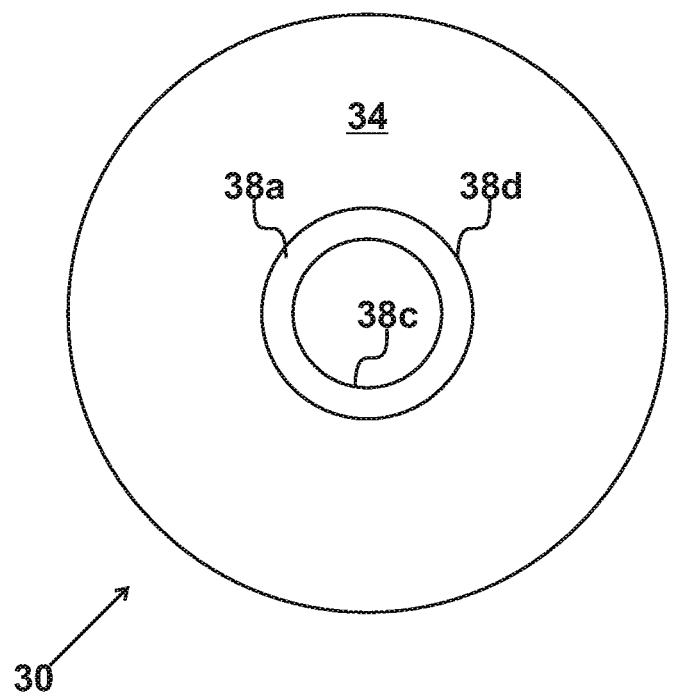
Figure 11:
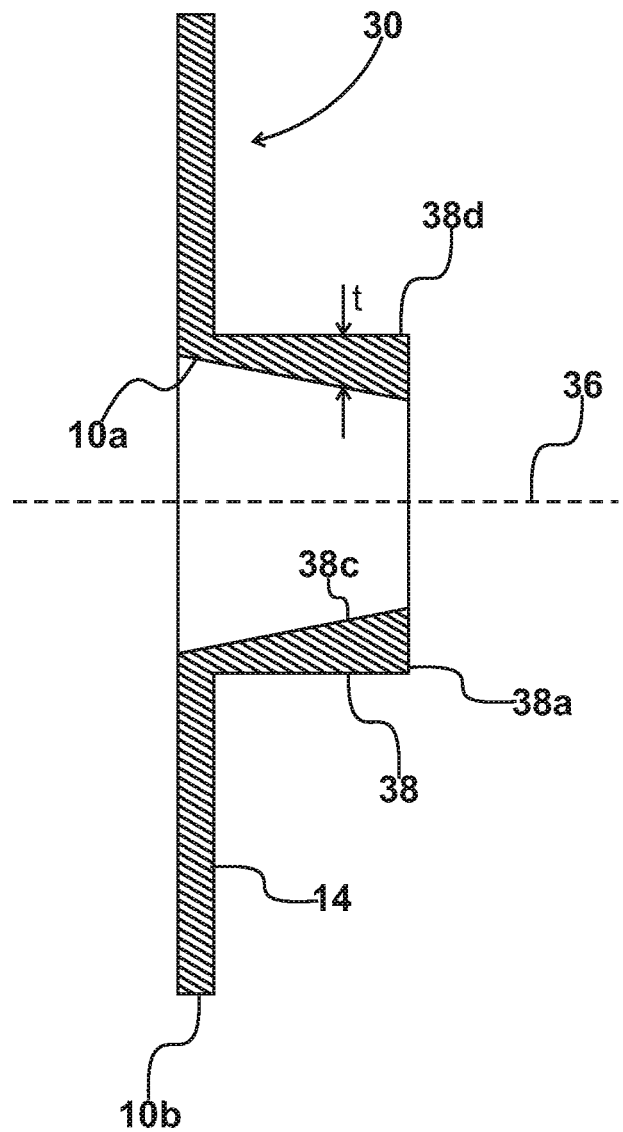

Referring then to FIGS. 9 to 11, a brake disc rotor 30 comprises a friction ring 34 annular about an axis 36, being the axis of rotation of a road wheel or axle, not shown. A tubular flange 38 extends axially from the friction ring 34 to a free end 38a. The friction ring 34 and the flange 38 are integrally formed from grey cast iron by casting and machining. The radially inner face 38c and the radially outer surface 38d that bound the wall 38e are both made smooth, as in the arrangement of FIGS. 5 to 8. In addition, however, the radial thickness t of the wall 38e increases towards the free end 38a of the flange 38. Thus, when an aluminium hub (not shown in FIGS. 9 to 11) cast over the flange 38 solidifies thereon, the configuration of the wall 38 provides positive resistance to axial forces. But the smoothness of the hub-engaging surfaces 38c and 38d permit differential thermal contraction, in an axial direction, of the hub relative to the flange 38 as the hub solidifies and cools after casting. Thus the arrangement of FIGS. 9 to 11 provides positive resistance to axial forces without compromising the need to avoid an untoward build-up of retained stresses in the hub.

As shown in FIGS. 9 to 11, the variation in the radial thickness t of the flange wall 38e is provided by sloping the inner face 38c radially inwardly towards the free end 38a of the flange 38. However it should be understood that otherwise the outer face 38d may be sloped radially outwardly towards the free end 38a instead of or as well as having the inner face 38c sloping radially inwardly towards the free end 38a.

Figure 12:
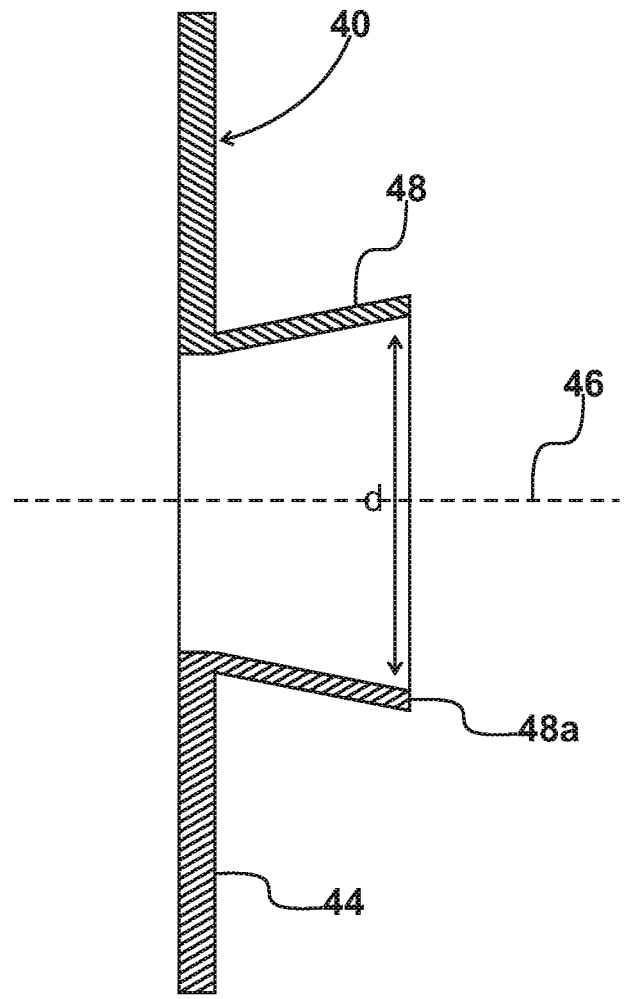
FIGS. 12 and 13 illustrate variants of the varying radial dimension of the flange, in each case showing the rotor in vertical cross section (as in FIGS. 5 and 9) with the hub omitted.
Figure 13:
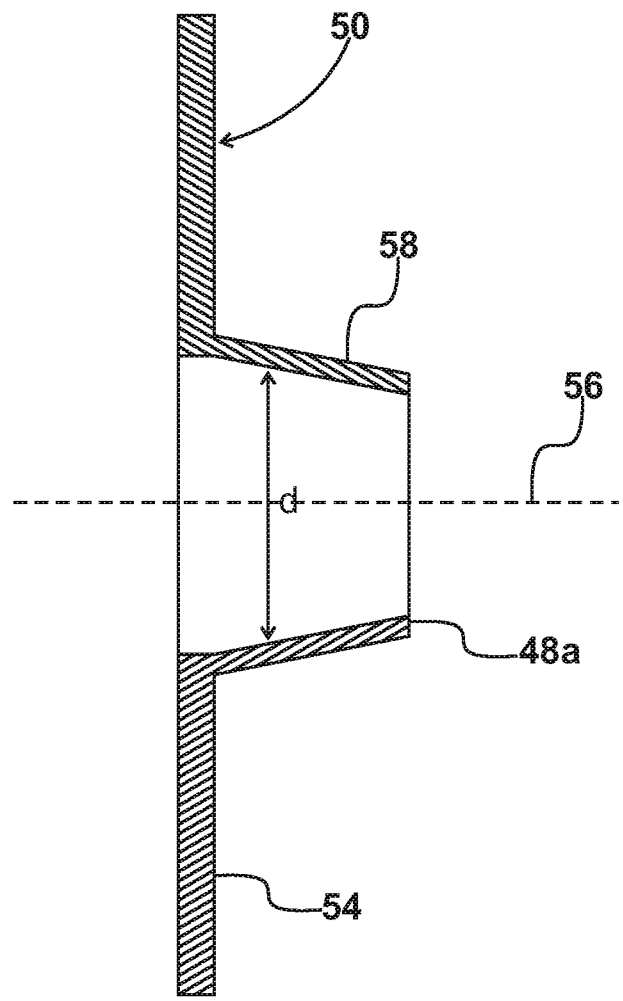

FIGS. 12 and 13 illustrate other ways in which variation in a radial dimension of the flange along its axial extent can be arranged to provide positive resistance to axial forces.

In the arrangement of FIG. 12 a brake disc rotor 40 comprises a friction ring 44 annular about an axis 46, being the axis of rotation of a road wheel or axle, not shown. A tubular flange 48 extends axially from the friction ring 44 to a free end 48a and the friction ring 44 and the flange 48 are integrally formed from grey cast iron by casting and machining. The radially inner face 48c and the radially outer surface 48d that bound the wall 48e of the flange 48 are both made smooth, as in the arrangement of FIGS. 9 to 11. But in the arrangement of FIG. 12, instead of varying the thickness of the flange wall as in the arrangement of FIGS. 9 to 11, the diameter d of the flange 48 increases towards its free end 48a. This increasing diameter (which may be combined with increasing wall thickness) provides positive resistance to axial forces on the hub (not shown in FIG. 12) without compromising the need to avoid an untoward build-up of retained stresses in the hub.

In the arrangement of FIG. 13 a brake disc rotor 50 comprises a friction ring 54 annular about an axis 56, being the axis of rotation of a road wheel or axle, not shown. A tubular flange 58 extends axially from the friction ring 54 to a free end 58a and the friction ring 54 and the flange 58 are integrally formed from grey cast iron by casting and machining. The radially inner face 58c and the radially outer surface 58d that bound the wall 58e of the flange 58 are both made smooth, as in the arrangement of FIG. 12. But in the arrangement of FIG. 13, the diameter d of the flange 58 decreases towards its free end 58a rather than increasing. This increasing diameter (which may be combined with increasing wall thickness) provides positive resistance to axial forces on the hub (not shown in FIG. 13) without compromising the need to avoid an untoward build-up of retained stresses in the hub.

Another approach to providing similarly positive resistance to axial forces without comprising the need to avoid an untoward build-up of retained stresses in the hub will now be described with reference to FIGS. 14 to 16.

Figure 14:
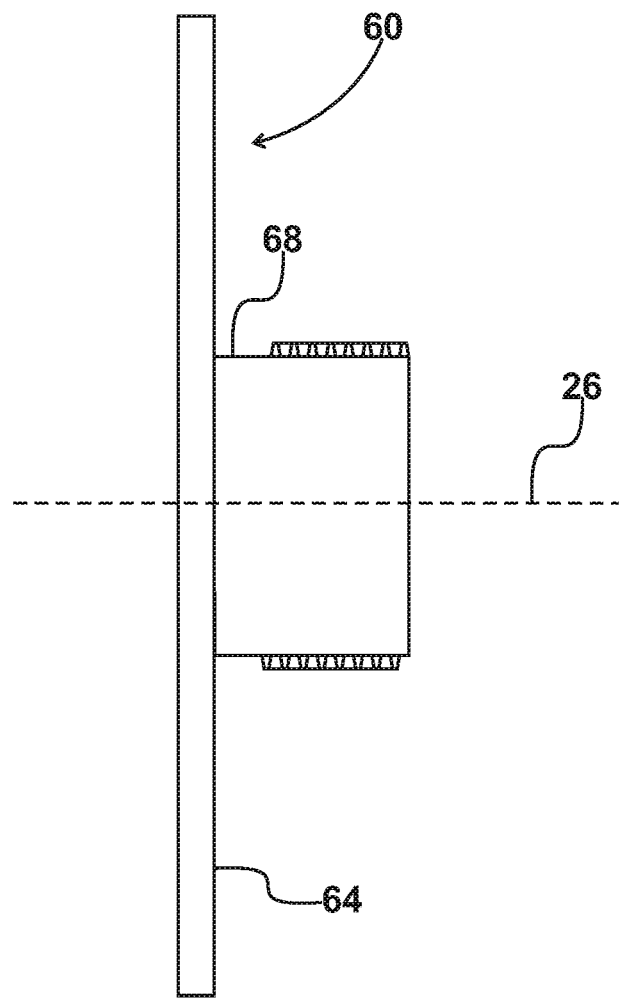
FIGS. 14 to 16 illustrate a third improvement upon the brake disc of FIGS. 1 to 4, in which the encapsulated portion of the flange wall is formed with a screw thread extending helically about the axis of rotation, which figures comprise respectively in FIG. 14 a side elevation, in FIG. 15 an end elevation and in FIG. 16 a cross section at X-X of FIG. 14, showing the rotor with the hub omitted.
Figure 15:
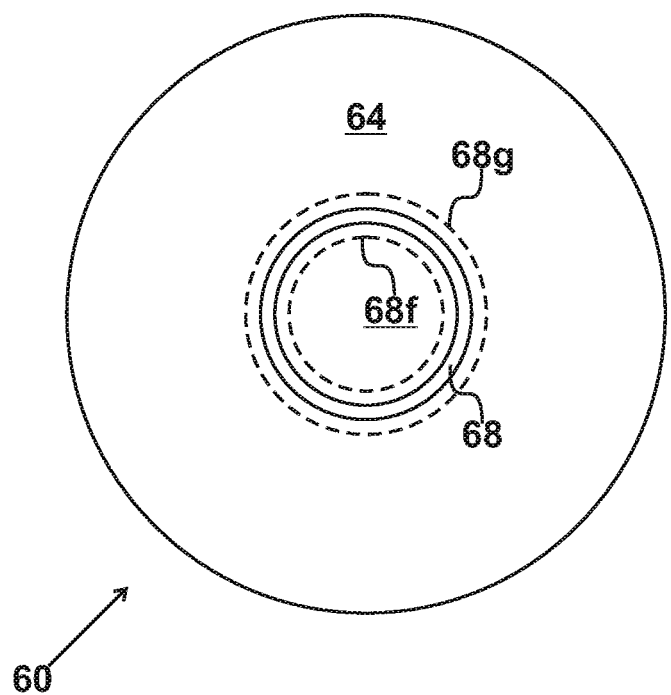
Figure 16:
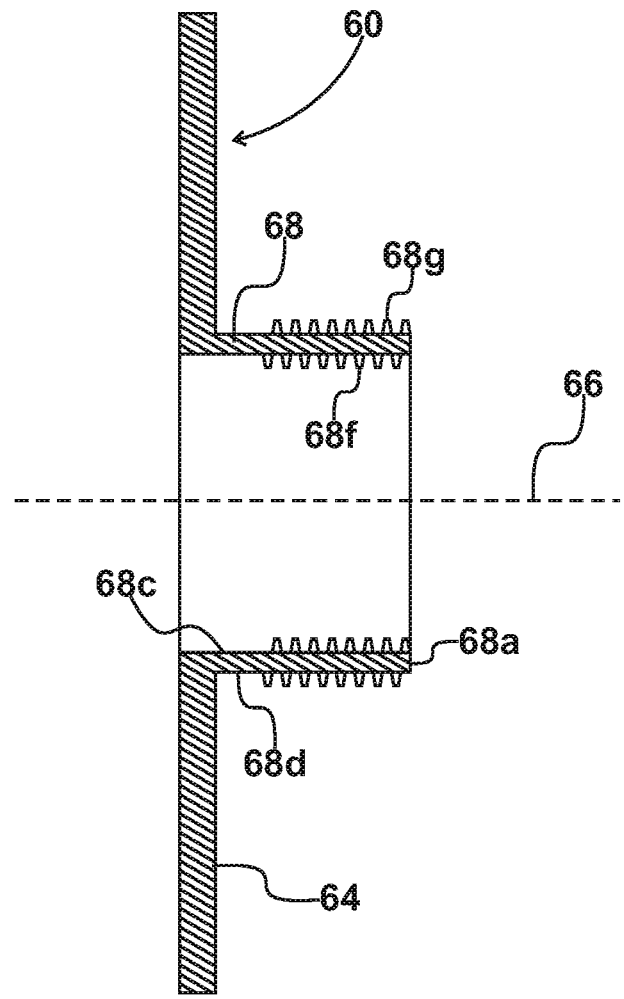

Referring then to FIGS. 14 to 16, a brake disc rotor 60 comprises a friction ring 64 annular about an axis 36, being the axis of rotation of a road wheel or axle, not shown. A tubular flange 68 extends axially from the friction ring 64 to a free end 68a. The friction ring 64 and the flange 68 are integrally formed from grey cast iron by casting and machining. Rather than simply being made smooth as in the arrangement of FIGS. 5 to 8, however, in the arrangement of FIGS. 14 to 17 the radially inner face 68c and the radially outer surface 68d of the flange 68 are respectively formed with screw threads 68f and 68g. (It should be understood that the depictions of the screw threads in the drawings are stylised and exaggerated for clarity of illustration).

The hub (not shown) is cast over the screw threads 68f and 68g and by their helical form these screw threads permit differential thermal contraction, in an axial direction, of the hub relative to the flange 68 as the hub solidifies and cools after casting. But when the cast hub has solidified and cooled, the screw threads prevent its being pulled axially off the flange. Thus the arrangement of FIGS. 14 to 16 provides positive resistance to axial separation of the hub relative to the flange without compromising the need to avoid an untoward build-up of retained stresses in the hub.

In many cases, a single screw thread on the radially innerface 68c or the radially outer face 68d will be sufficient to provide a positive resistance to axial movement of the hub relative to the friction ring. Otherwise, where abnormally high axially forces are expected, eg on a race track, the positive resistance of the two screw threads can be increased by forming them with mutually opposite hands—with the inner screw thread 68c having a right-hand thread and the outer screw thread 68d having a left-hand thread, or vice versa.

The screw thread form used in the invention is a stub Acme thread. A trapezoidal form like the Acme thread is used because it is relatively easy to cut (compared with say a square thread) and relatively strong, having a wide base.

This applies more so to the stub Acme form, inasmuch as this has a lower depth. And known problems in disassembling the stub Acme thread are not relevant in this use.

Other thread arrangements that may be used in the present invention will now be described very briefly with reference to FIGS. 17 to 20.

Figure 17:
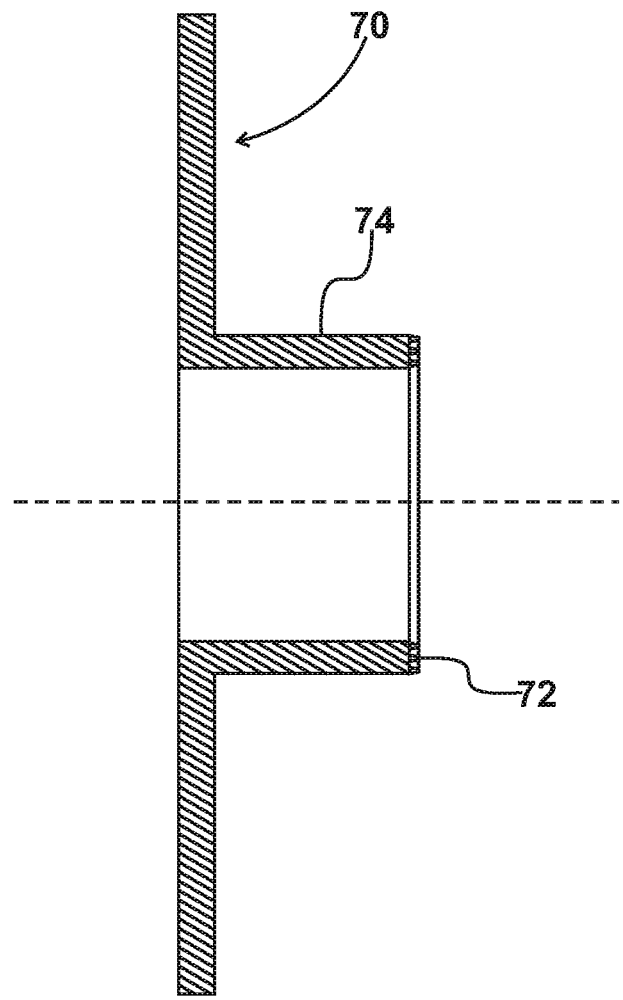
FIGS. 17 to 20 illustrate variants of the screw thread feature, in each case showing the rotor in vertical cross section (as in FIGS. 5, 9, 12, 13 and 16) with the hub omitted.

In the arrangement illustrated by FIG. 17, the rotor 70 has a spiral screw thread 72 formed on the free end of the axially-extending tubular flange 74. The screw thread 72 functions like the axially extending teeth 28b of the arrangement illustrated by FIGS. 5 to 8 in that it is encapsulated by the hub (not shown in FIG. 16) when the hub is cast onto the rotor 70 to be a shrink fit thereon.

Figure 18:
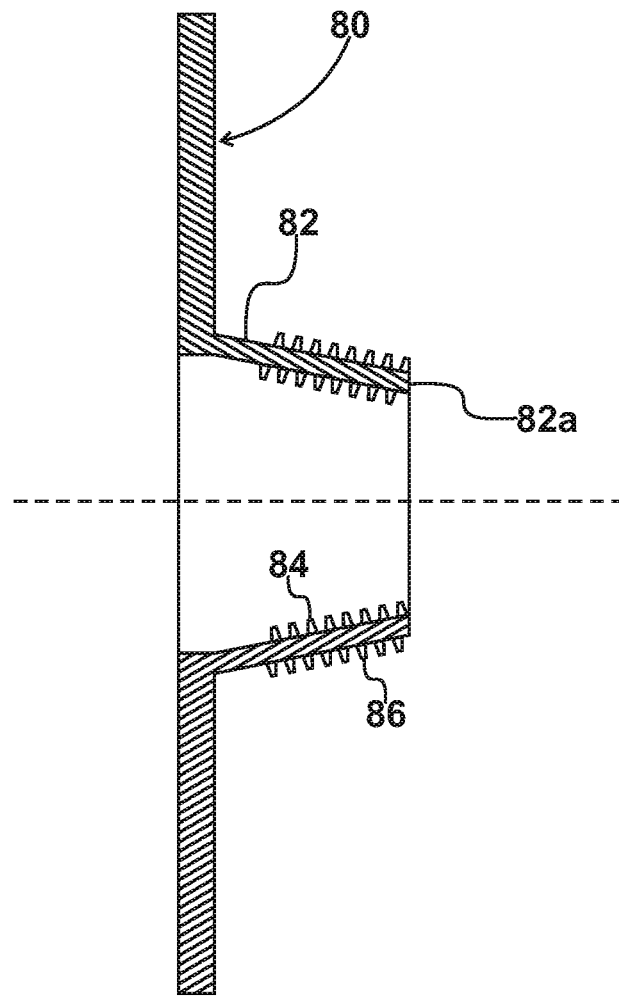

In the arrangement illustrated by FIG. 18, the rotor 80 has a tubular flange 82 extending axially from it that has a diameter that reduces towards its free end 82a. Helical screw threads 84 and 86 are formed on the inner and outer faces of the flange 82. When the hub (not shown in FIG. 17) is cast onto the flange 82 it encapsulated the screw threads 84 and 86 and forms a secure shrink-fit connection with them.

Figure 19:
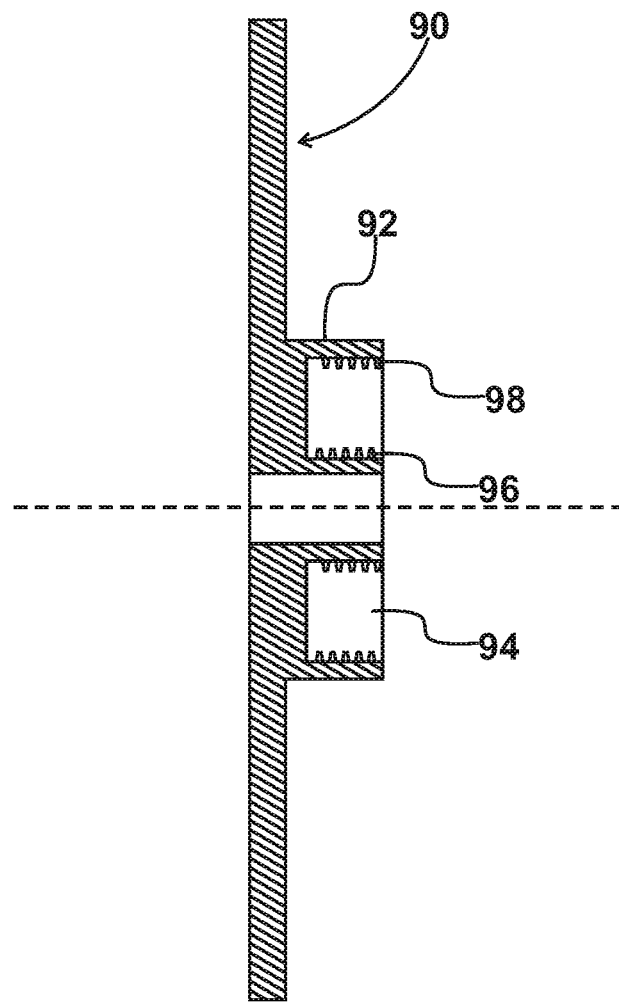

In the arrangement illustrated by FIG. 19 the rotor 90 includes an axially extending flange 92 with a wall of greater radial thickness than the flanges illustrated by the other drawings hereof. The greater radial thickness accommodates an annular channel 94 with helical screw threads 96 and 98 formed in the inner and outer cylindrical faces of the annular channel. When the hub (not shown in FIG. 19) is cast onto the flange 92 it encapsulated the screw threads 96 and 98 and forms a secure shrink-fit connection with them.

Figure 20:
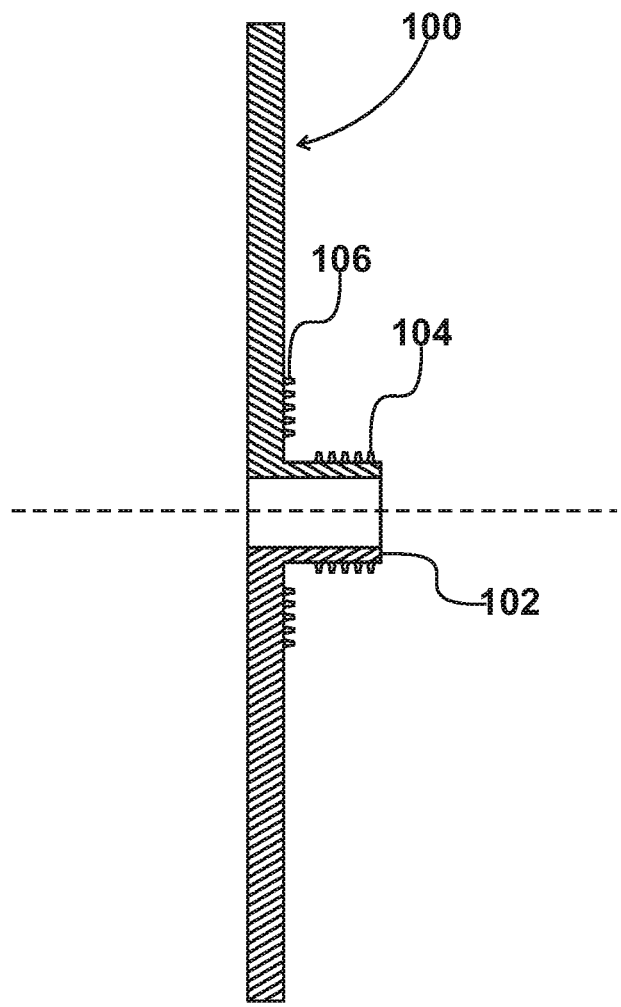

In the arrangement illustrated by FIG. 20 the rotor 100 includes an axially-extending tubular flange 102. A helical screw thread 104 is formed on the radially outer surface of the flange 102 and a spiral screw thread 106 is formed on the face of the rotor 100 directed in the same direction as the flange 102. When the hub (not shown in FIG. 20) is cast onto the flange 102 it encapsulates the screw threads 104 and 106 and forms a secure shrink-fit connection with them.

Brake discs according to the invention are made as follows.

(a) The rotor, including the axially-extending tubular flange, is cast from grey cast iron on a DISAmatic® production line utilising flaskless, vertically-parted moulds and sacrificial cores. (DISAmatic is a registered trade mark of DISA Industries AS of Taastrup, Denmark).

(b) A mould is formed with a cavity to receive the rotor and define the form of the hub to be cast thereon.

(c) A portion of the wall of the rotor is configured to permit differential thermal movement, in an axial direction, between the flange and the hub when the hub is cast thereon.

(d) The rotor is pre-heated and placed in the cavity of the mould with its flange extending into the hub-defining part of the mould cavity.

(e) Aluminium alloy in a molten state is delivered into the hub-defining part of the mould cavity to encapsulate a portion of the wall of the flange.

(f) The rotor and the hub are allowed to cool so that the hub solidifies and shrinks onto the encapsulated portion of the flange.

If the encapsulated portion of the flange is to be smooth to permit the differential thermal movement, the smoothing is done by machining such as turning, honing or the like.

If the encapsulated portion of the flange is to have a radial dimension which varies along its axial extent, this is done partly in the casting of the rotor and partly by subsequent machining.

If the encapsulated portion of the flange is to be formed with a screw thread, this is done by machining after the rotor is cast.

In more detail, the recommended process for producing a brake disc embodying the present invention is as follows. The cast iron rotor is part machined via computer numerical control (CNC) turning. This creates a cast iron part with axially extending teeth that project, with tapered geometry away from the disc rotor. This cast iron disc rotor has its axially extending teeth and neighbouring rotor area, heated via gas flame to a temperature below the melting point of aluminium, which provides a good bond between the cast aluminium and the iron of the rotor. The heated rotor is placed into a two-piece steel mould and centralised upon a locating feature to ensure concentricity with the aluminium hub mould and the part machined rotor. The mould parts are also heated. The molten aluminium is top-poured and gravity fed into the cavity.

Figure 21:
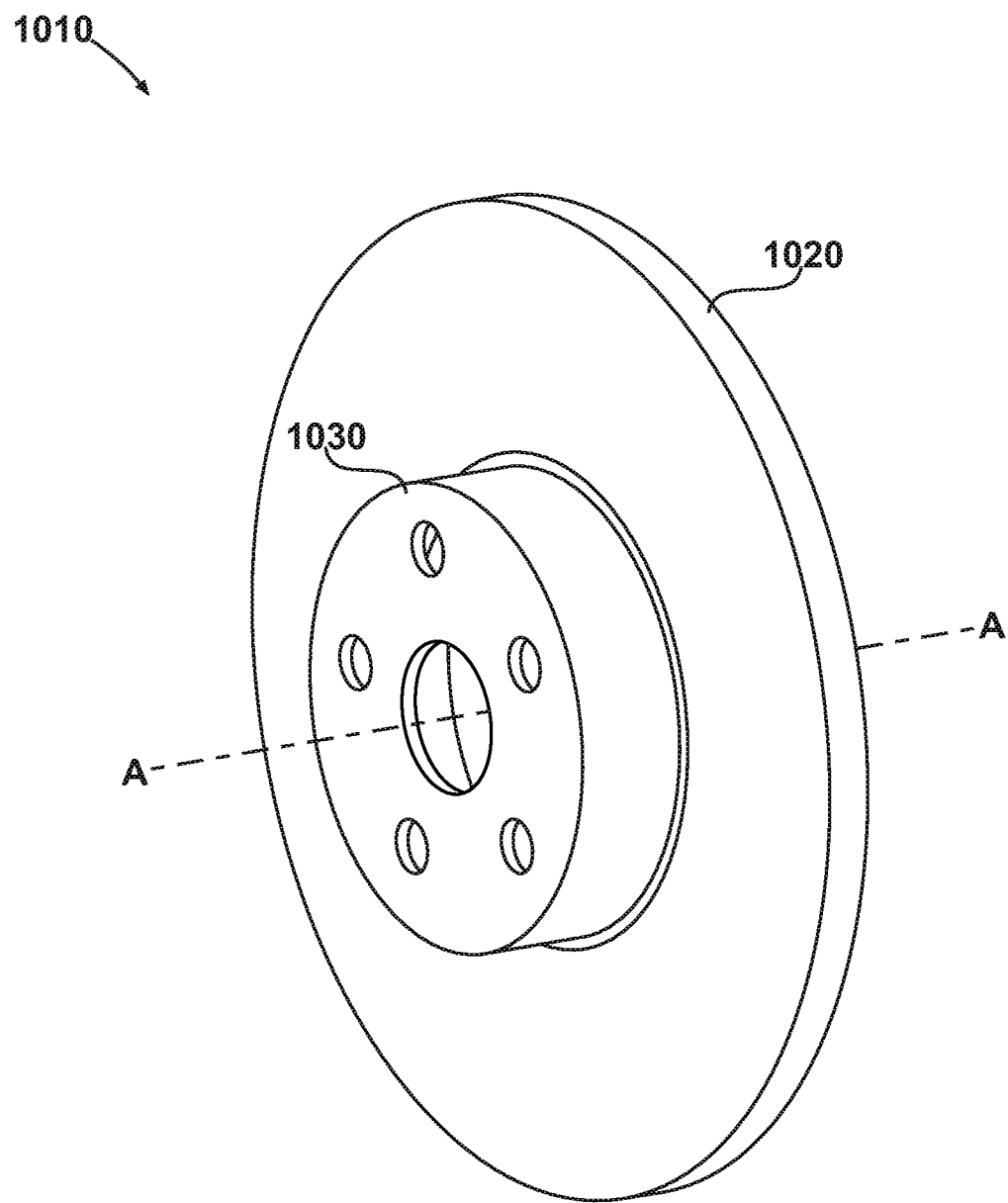
FIG. 21 shows a particular form of brake disc according to the present invention.

A particular form of brake disc 1010 according to the present invention is illustrated in FIG. 21.

In this embodiment, the brake disc 1010 is a solid disc brake for fitting to a passenger vehicle, but it will be appreciated by those skilled in the art that the principles of the present invention may be extended to ventilated disc brakes targeted at high performance applications.

The brake disc 1010 has a friction ring 1020 annular around an axis A-A (the axis of rotation of a road wheel or axle, not shown), and a mounting bell 1030. The friction ring 1020 is formed of a first material, and the mounting bell 1030 is formed of a second material that is different to the first material. In the present embodiment, the friction ring 1020 is made of iron, and the mounting bell 1030 is made of aluminium alloy. Other alloys could be used depending upon the application, in particular high carbon content steel may be used for the friction ring 1020.

Figure 22:
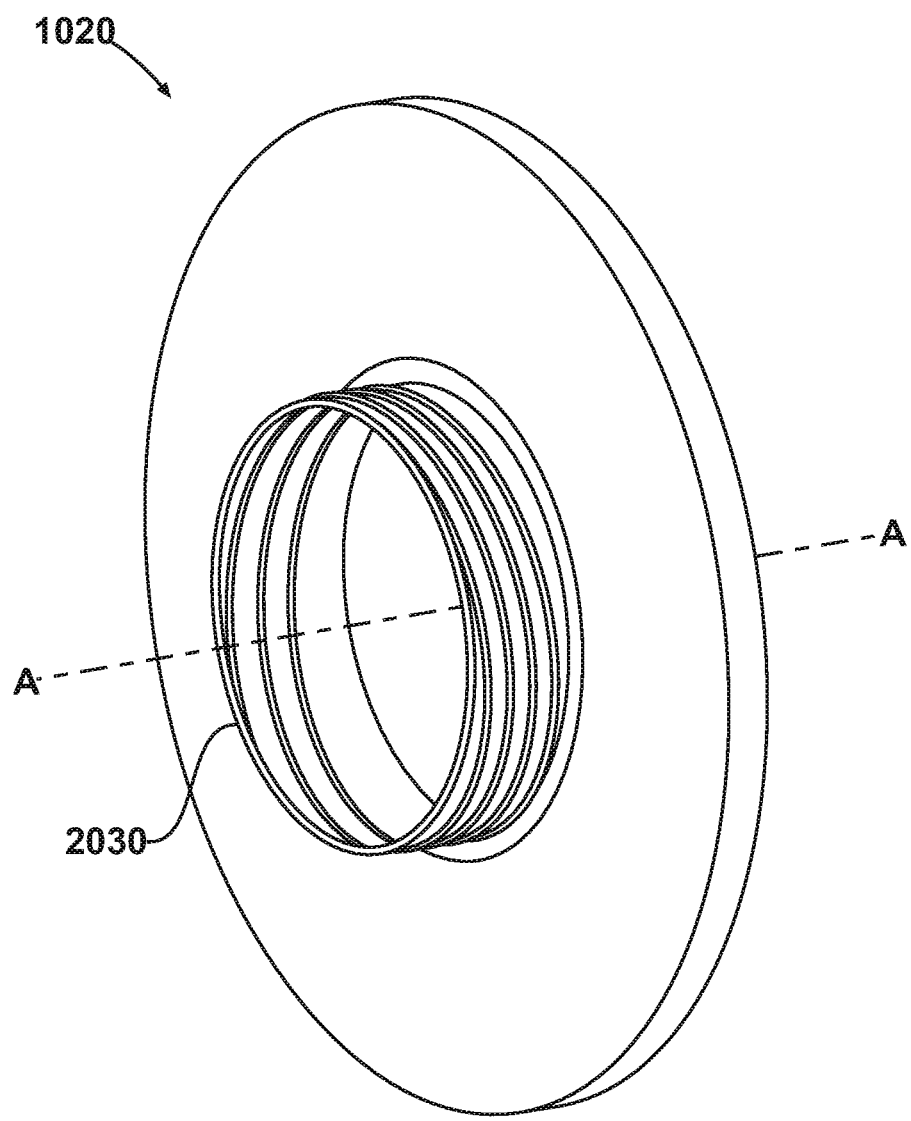
FIG. 22 shows the friction ring and the hollow flange of the brake disc shown in FIG. 21.
Figure 23:
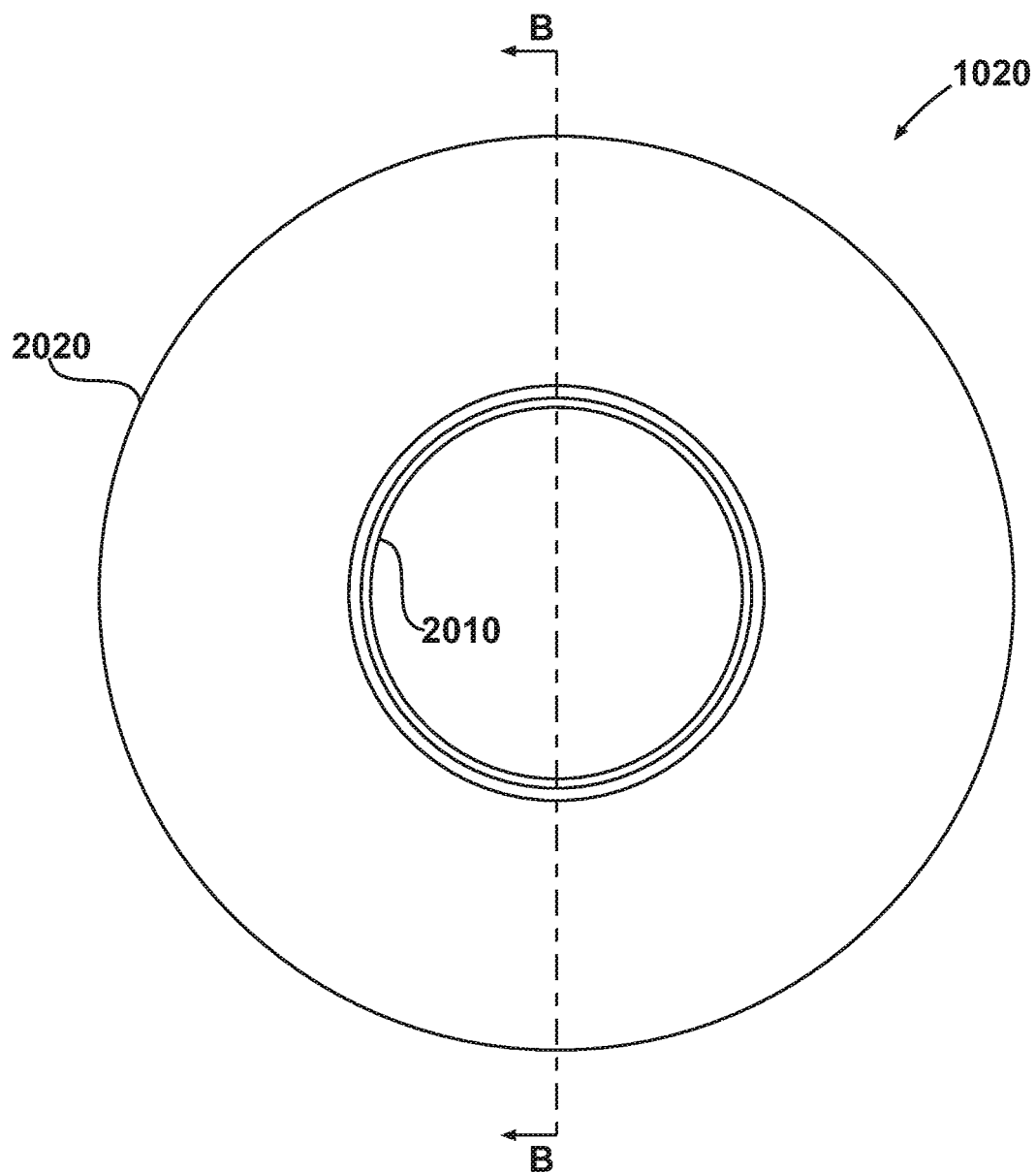
FIG. 23 is a plan view of the friction ring shown in FIG. 22.

As described previously, the present invention is directed towards a composite brake disc and thus provision is made for connection of the mounting bell 1030 to the friction ring 1020, the latter of which shown in isolation in a perspective view in FIG. 22 and in plan view in FIG. 23.

The friction ring 1020, which extends radially in a plane from an inner radius 2010 to an outer radius 2020, has a hollow flange 2030 which extends axially from the friction ring 1020, i.e. orthogonally from its plane. The inner radius 2010 of the friction ring 2020 is coterminous with the inside surface of the flange 2030. In the embodiment shown in FIGS. 22 and 23, the flange 2030 is cylindrical, but other forms are contemplated such as a conical frustum, as will be described with reference to FIGS. 28A and 28B.

Figure 24A:
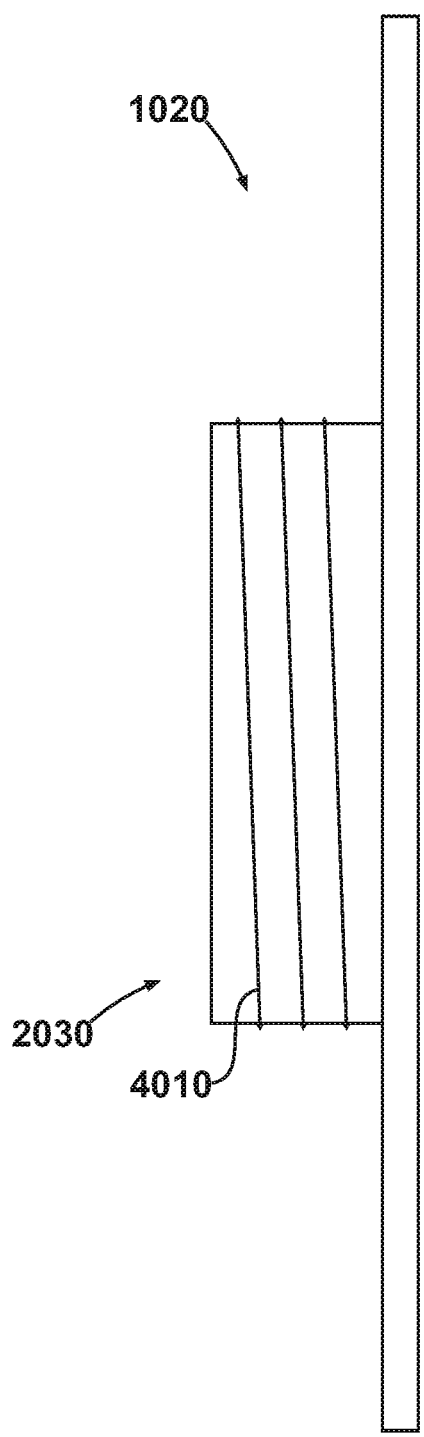
FIG. 24A and FIG. 24B are respectively a front elevation of the friction ring shown in FIG. 22, and a section along B-B of FIG. 22.

A front elevation of the friction ring 1020 is shown in FIG. 24A, and a section along B-B of FIG. 23, is shown in FIG. 24.

Figure 24B:
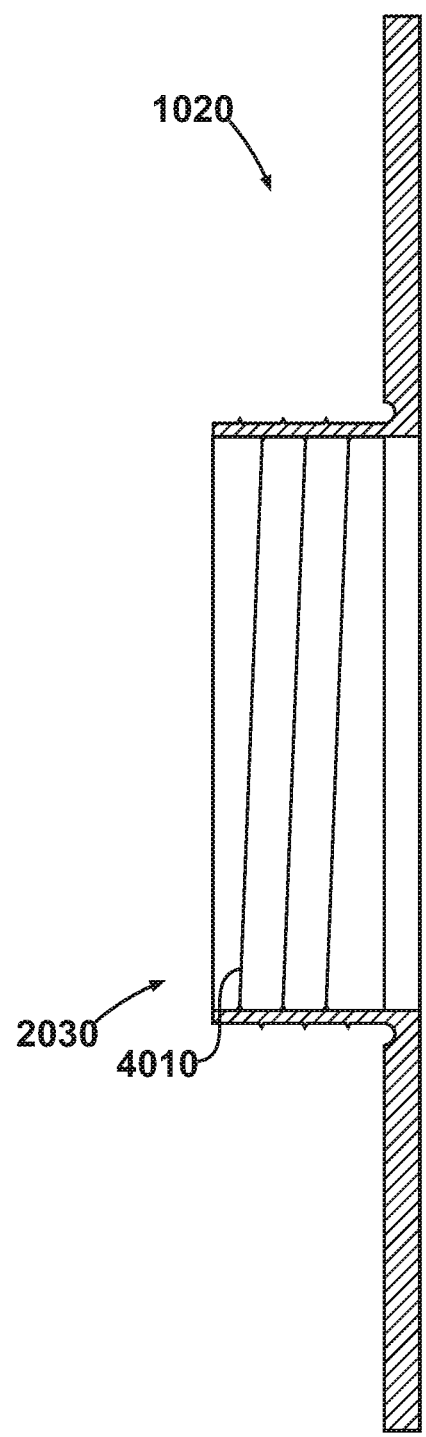

Referring to FIG. 24A, the outer surface of the flange 2030 has a first thread 4010 thereon. Referring to FIG. 24B, the inner surface of the flange 2030 has a second thread 4020 thereon. In the present example, first thread 4010 is a left-handed thread and the second thread 4020 is a right-handed thread: they are therefore of opposite handedness. It will of course be appreciate that the handedness of the first and second threads may be reversed.

In practice, the brake disc 1010 of the present invention is manufactured by first pre-forming the friction ring 1020. In the present embodiment, this is achieved in an embodiment by casting the friction ring 1020 from the chosen first material, and then subjecting it to appropriate machining to form the threads on the flange 2030.

The friction ring 1020 is then located in a mould having a cavity for the flange 2030. The cavity has the desired shape for the mounting bell 1030. Molten second material is delivered into the cavity to fill and engage with the flange. The mounting bell 1030 is then allowed to cool and solidify in the mould. Optionally, the friction ring 1020 may be heated prior to delivery of the second material to improve the interface between the materials, and reduce any thermal shock caused by the addition of molten second material.

Those skilled in the art will appreciate that after the mounting bell 1030 has been cast on to the flange 2030, the brake disc 1010 comprising the friction ring 1020 plus mounting bell 1030 can be subject as a whole to further machining before it is fitted to a vehicle. In addition, alternative methods of attaching the mounting bell to the flange are contemplated, such as the forming of the mounting bell as a multi-part component to be fitted around the pre-formed flange on the friction ring for joining thereto.

In a specific embodiment, the second material for the mounting bell 1030 is selected so that has a higher coefficient of linear thermal expansion than the first material of the friction ring 1020. For example, as described previously iron or an alloy thereof (such as grey iron) may be used for the friction ring and aluminium or an alloy thereof for the hub. During manufacture, the mounting bell 1030 contracts more than the flange 2030 as it cools after being cast. This, in combination with the mounting bell 1030 being arranged to extend over both the outer and inner surfaces of the flange 2030, results in a tighter joint being formed.

Not only does this result in a stronger joint that can be subjected to greater axial forces, it also results in an interface between the first material and second material that is better protected against the ingress of moisture which could function as an electrolyte and thereby give rise to galvanic corrosion. As will be appreciated by those skilled in the art, the interface between two materials of differing electrode potential is liable to galvanic corrosion in the presence of an electrolyte, such as is the case when, for example, an aluminium alloy is cast on to grey cast iron.

Figure 25:
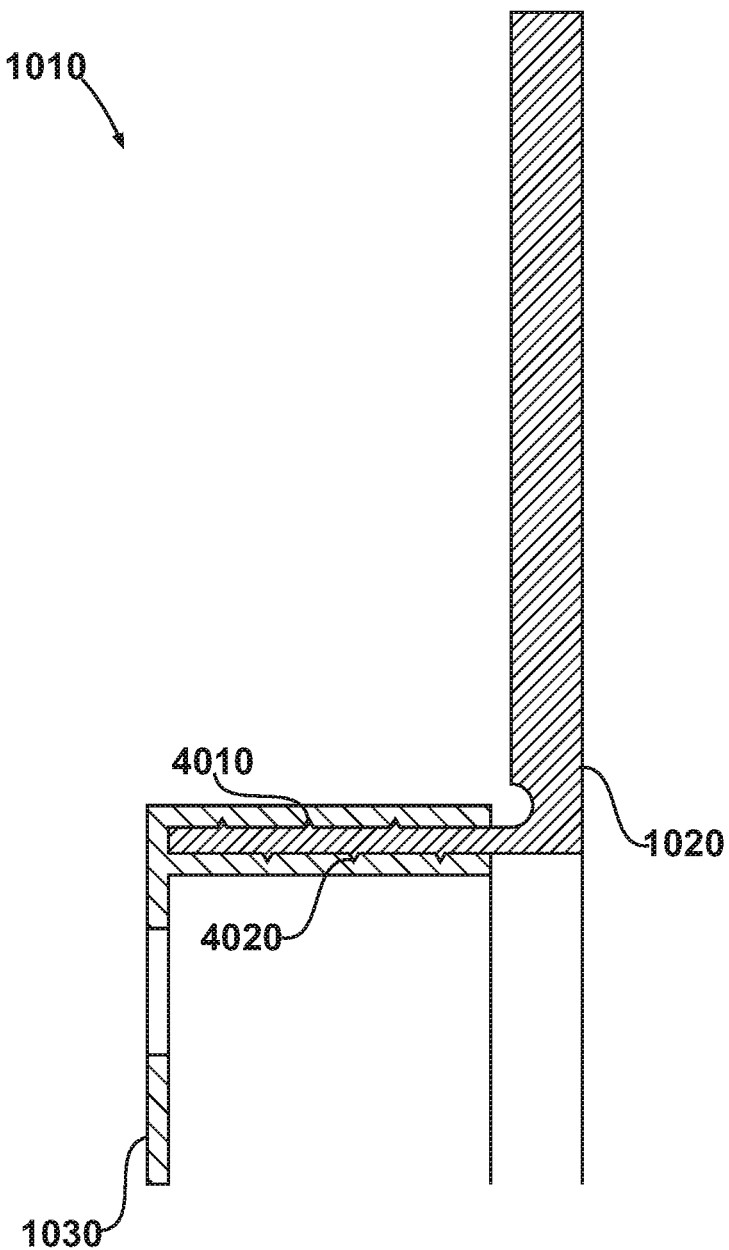
FIG. 25 is a section of the brake disc shown in FIG. 21, showing the encapsulation of the flange in the mounting bell.

FIG. 25 therefore shows an enlargement of the section of the friction ring 1020 shown in FIG. 24B following casting of the mounting bell 1030 thereon.

As can be seen, the first thread 4010 and the second thread 4020 are encapsulated in the mounting bell 1030. Thus any torque applied that may tend to result in a loosening with respect to one thread results in a tightening with respect to the other. Torque transmission in forward and reverse directions of rotation is therefore permitted without risk of the mounting bell separating from the flange.

Various modifications of the brake disc 1010 are possible, and one of these is the provision of additional threads on the flange 2030. Such an embodiment is illustrated in FIGS. 26A and 26B, which are respectively a front elevation and a section of the friction ring 1020 with this variant flange 6010.

As with flange 2030, a first thread 6020 of one handedness is provided on the outer surface of flange 6010 and a second thread 6030 of opposite handedness is provided on its inner surface. In this embodiment, however, additional threads are provided. Thus, a third thread 6040 of opposite handedness to first thread 6020 is provided on the outer surface of the flange 6010, and a fourth thread 6050 of opposite handedness to second thread 6030 is provided on the inner surface of the flange 6010.

Figure 27:
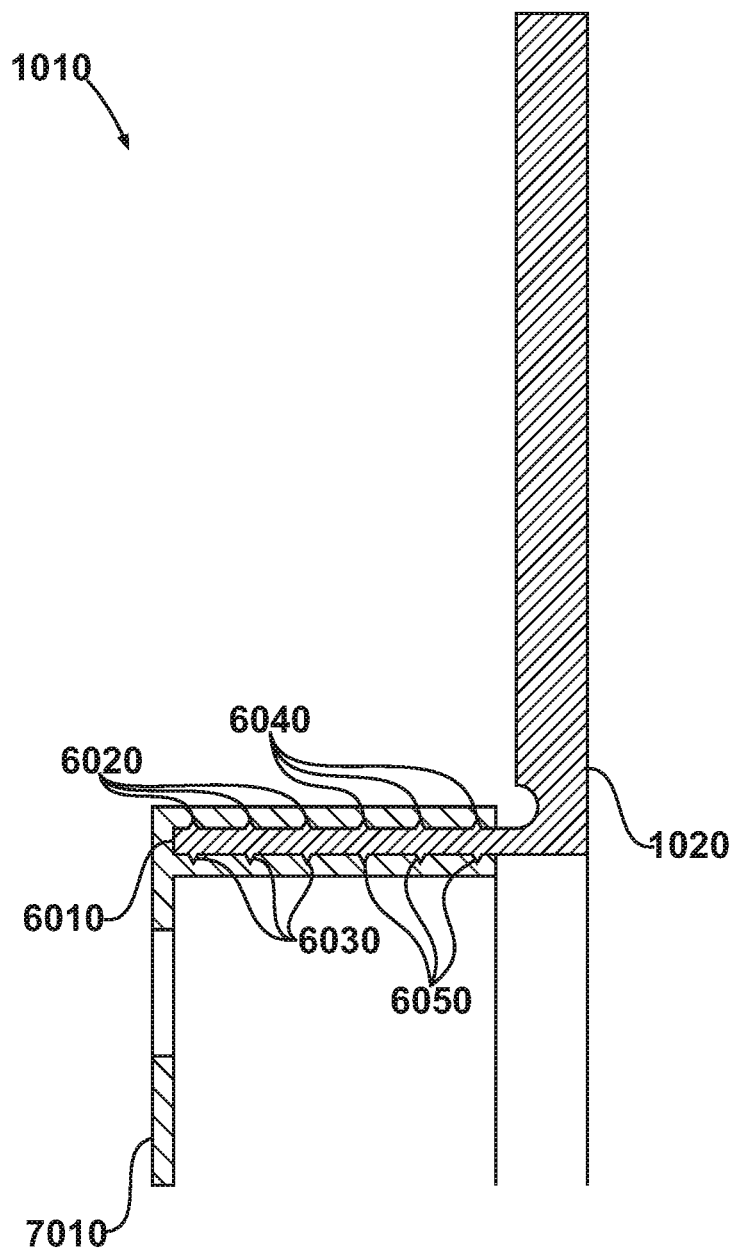
FIG. 27 is a section of a brake disc with the friction ring of FIGS. 26A and 26B showing the encapsulation of the threads.

An enlargement of the flange 6010 following casting of a mounting bell 7010 thereon is shown in FIG. 27. As can be seen in FIG. 27, more contact surface area between the mounting bell 7010 and the threads is provided, but in addition, due to the presence of two threads of opposite handedness on both the inner and outer surfaces of the flange 6010, there is no tendency for the thread on the outer surface to encourage loosening during braking events, for example.

Figures 28A, 28B:
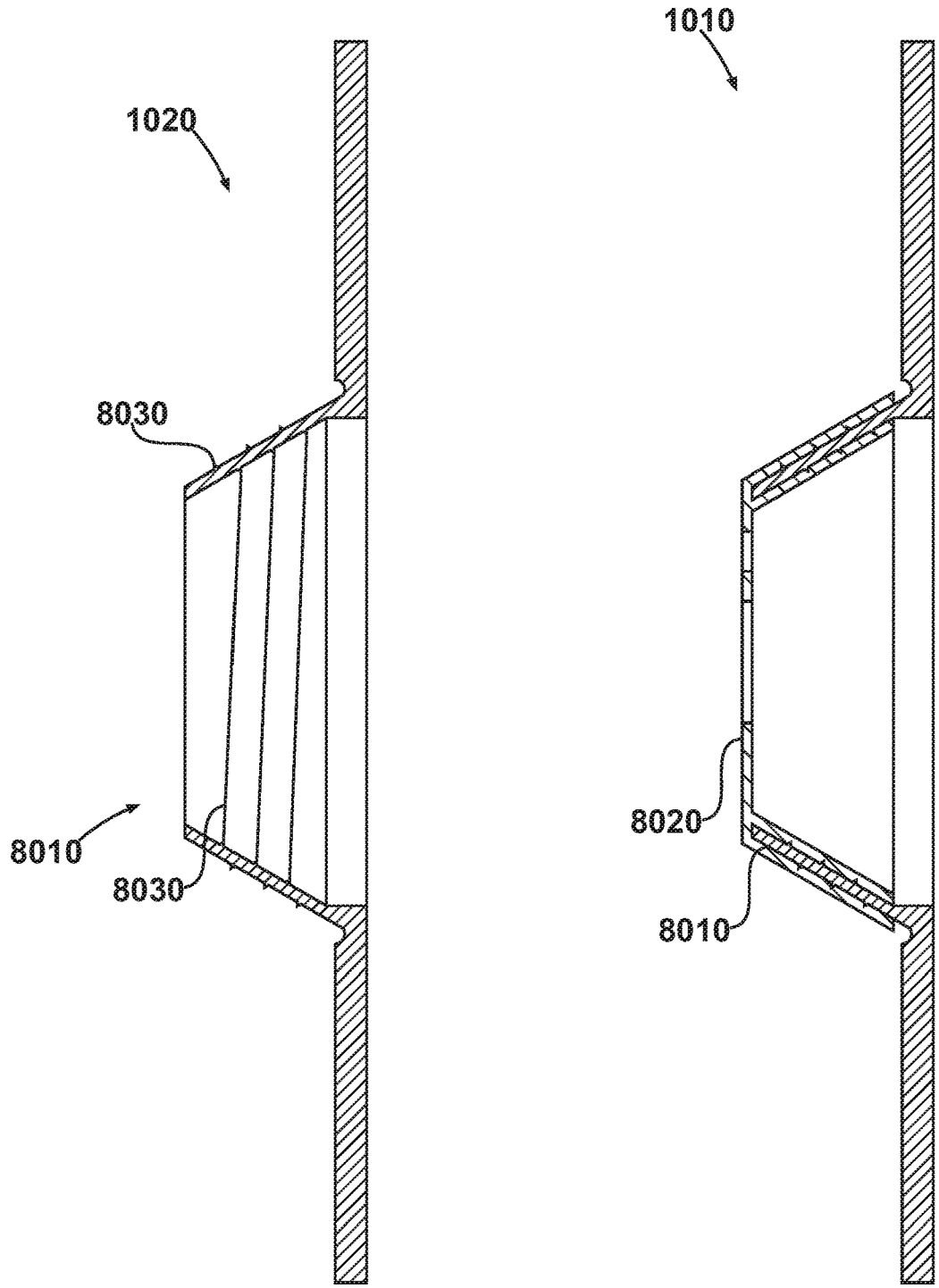
FIG. 28A and FIG. 28B are respectively a section of an alternative embodiment of the friction ring shown in FIG. 22, which has a frustoconical flange, and a section showing the frustoconical flange encapsulated in a frustoconical mounting bell.

Another modification of the brake disc 1010 is shown in FIG. 28A and FIG. 28B, which are respectively a section of an alternative embodiment of the friction ring shown in FIG. 22, which has a frustoconical flange 8010, and a section showing the frustoconical flange 8010 encapsulated in a frustoconical mounting bell. A first thread 8020 of one handedness is on the outer surface of flange 8010, and a second thread 8030 of opposite handedness is on the inner surface. The arrangement of with opposing threads on both the inner and outer surfaces as with flange 6010 could also be used.

The frustoconical form of flange 8010 allows fitment to certain types of vehicle hubs and may be lighter than the cylindrical form of flange 2030.

Figure 29:
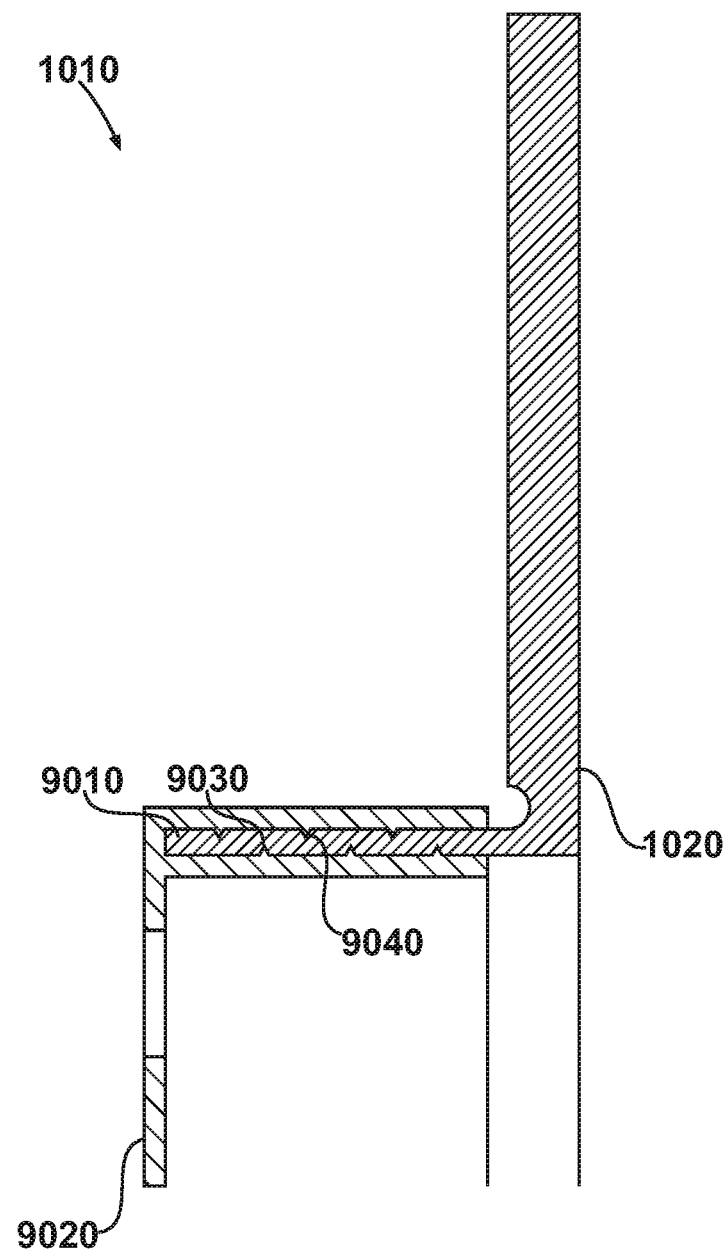
FIG. 29 shows another alternative friction ring with threads that are recessed into the flange.

Whilst the threads on flanges 2030, 6010 and 8010 are projections outward from the flange, a further variant flange 9010 comprises threads that are recesses in the flange as shown in FIG. 29. Thus, the mounting bell 9020 of this variation of the brake disc 1010 fills the inner threads 9030 and the outer threads 9040 on the flange 9010. This may assist in reducing material cost during production as less of the flange needs to be machined away. It will be appreciated by those skilled in the art that this configuration for the threads may be combined with any other variant of the flange.

Figure 30A:
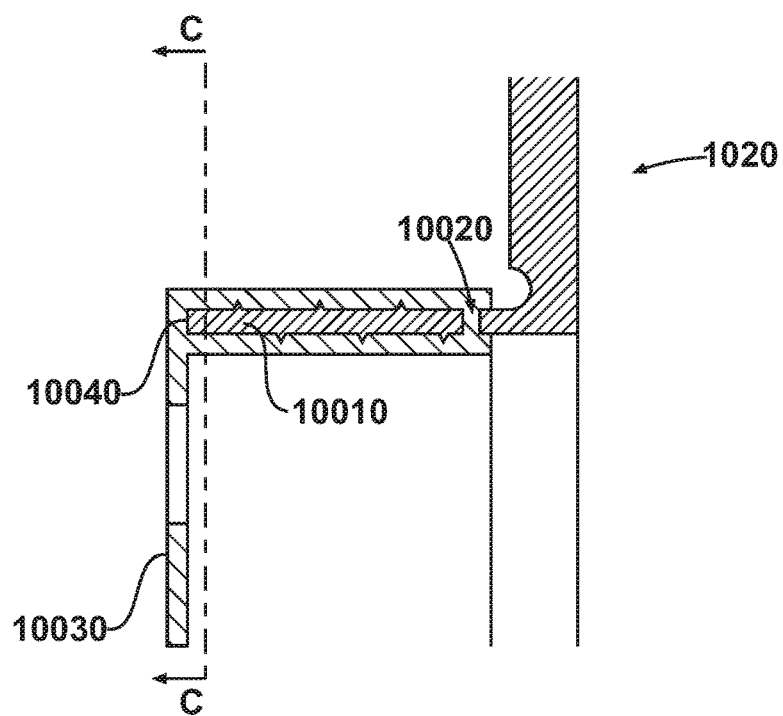
FIG. 30A and FIG. 30B are respectively a section of another alternative friction ring, having a flange with holes therein and axial castellations, and a section along C-C of FIG. 30A.

Torque transfer between the mounting bell and the friction ring may be improved by the addition of holes in the flange, as shown in the sectional view of FIG. 30A. The variant flange 9050 includes holes 9060 distributed around its circumference which are filled by the mounting bell 9070.

Figure 30B:
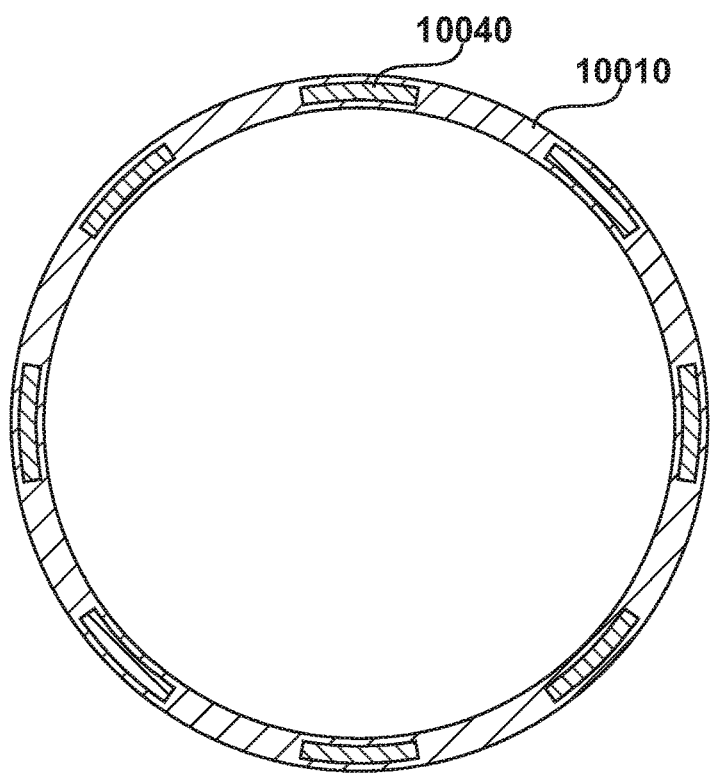

Further improvement in torque transfer can be achieved by inclusion of axial castellations 9080, as shown in FIG. 30B which is a section on C-C of FIG. 30A.

Addition of either (or both) of the holes and castellations can help remove stress on the threads under braking and acceleration.

The invention claimed is:

1. A brake disc for a vehicle, which brake disc comprises:
   a rotor formed of a first material and comprising a friction ring annular about an axis of rotation and, coaxial with the friction ring, a generally tubular flange extending axially from the friction ring to a free end and having a wall with a radially inner face and a radially outer face; and
   a hub securable to a wheel or an axle of the vehicle for rotation therewith about the axis and being formed of a second material of a lower density, a lower melting point and a higher coefficient of thermal expansion than the first material;
   the hub being cast over the flange to encapsulate at least a portion of the wall;
   wherein the encapsulated portion of the wall has a configuration (a) with no positive resistance to differential thermal contraction, in an axial direction, of the hub relative to the flange as the hub solidifies over the flange during its casting and (b) with positive resistance to axial separation of the hub from the flange after the cast hub has solidified on the flange.

2. A brake disc according to claim 1, wherein the encapsulated portion of the wall is formed with axially extending teeth circumferentially spaced apart at the free end of the flange.

3. A brake disc according to claim 1, wherein the encapsulated portion of the wall is smooth so as to facilitate the differential thermal contraction of the hub as it solidifies on the flange.

4. A brake disc according to claim 1, wherein the flange has a radial dimension which varies along its axial extent.

5. A brake disc according to claim 4, wherein the radial dimension is the thickness (t) of the wall of the flange and the thickness (t) increases towards the free end of the flange or reduces towards the free end of the flange.

6. A brake disc according to claim 4, wherein the radial dimension is the diameter (d) of the flange, which increases towards the free end of the flange or reduces towards the free end of the flange.

7. A brake disc according to claim 1, wherein the encapsulated portion of the wall of the tubular flange is formed with a screw thread extending helically about the axis of rotation.

8. A brake disc according to claim 7, wherein the encapsulated portion of the wall is formed with a first screw thread on the radially inner face of the wall and a second screw thread on the radially outer face of the wall.

9. A brake disc according to claim 8, wherein the first screw thread and the second screw thread are of mutually opposite hands.

10. A brake disc according to claim 1, wherein the first material comprises iron from which the friction ring and the flange are integrally formed by casting and the second material comprises aluminum or an alloy thereof.

11. A method of manufacturing a brake disc according to claim 1, which method comprises the steps of:
casting the rotor;
providing a mold with a cavity to receive the rotor and define the form of the hub;
placing the rotor in the cavity; and
delivering the second material in a molten state into the mold to encapsulate the portion of the wall of the flange, to solidify thereon and to cool;
wherein the method comprises configuring the encapsulated portion of the wall of the flange (a) to permit differential thermal contraction, in an axial direction, of the hub relative to the flange as the hub solidifies over the flange during its casting and (b) to positively resist axial separation of the hub from the flange after the cast hub has solidified on the flange.

12. A method of manufacturing a brake disc according to claim 11, wherein the method comprises mechanically smoothing at least a section of the portion of the wall to be encapsulated in the hub before placing the rotor in the mold.

13. A method of manufacturing a brake disc according to claim 11, wherein the method comprises heating the rotor before placing it in the mold.

14. A brake disc for a vehicle, comprising:
a friction ring annular about an axis and having an inner radius and an outer radius;
a hollow flange extending axially from the inner radius of the friction ring, and having an outer surface with a first thread thereon, and an inner surface with a second thread thereon of opposite handedness to the first thread; and
a mounting bell that extends over the outer surface and the inner surface of the flange in engagement with the first thread and the second thread;
wherein the friction ring and the flange are integrally formed of grey cast iron, and the mounting bell is formed of aluminum or an alloy thereof.

15. A brake disc according to claim 14, wherein the hollow flange is of cylindrical or frustoconical form.

* * * * *